United States Patent [19]

Minoura et al.

[11] Patent Number: 4,991,121
[45] Date of Patent: Feb. 5, 1991

[54] IMAGE DISPLAY SYSTEM

[75] Inventors: Nobuo Minoura; Satoshi Iwamatsu; Katsuo Nakadai, all of Tokyo, Japan

[73] Assignee: Fuji Photo Film Co., Ltd., Kanagawa, Japan

[21] Appl. No.: 353,164

[22] Filed: May 15, 1989

Related U.S. Application Data

[63] Continuation of Ser. No. 917,951, Oct. 14, 1986, abandoned.

[30] Foreign Application Priority Data

Oct. 16, 1985 [JP] Japan ............................... 60-228907
Feb. 28, 1986 [JP] Japan ............................... 61-44681

[51] Int. Cl.$^5$ ............................................. G06F 15/366
[52] U.S. Cl. .................................... 364/521; 364/518; 340/721; 340/716; 360/69
[58] Field of Search .................... 364/518, 521, 522; 340/720, 825, 825.22, 825.23, 825.24, 721, 716; 358/906, 907, 908; 360/69, 98; 382/8; 235/379

[56] References Cited

U.S. PATENT DOCUMENTS

| | | | |
|---|---|---|---|
| 3,947,882 | 3/1976 | Lightner | 360/92 |
| 4,284,126 | 8/1981 | Dawson | 340/825.22 |
| 4,298,860 | 11/1981 | Norberg et al. | 340/825.22 |
| 4,366,475 | 12/1982 | Kishi et al. | 364/521 |
| 4,583,133 | 4/1986 | Shoji et al. | 360/69 |
| 4,617,457 | 10/1986 | Granzow et al. | 235/379 |
| 4,642,717 | 2/1987 | Matsuda et al. | 358/906 |
| 4,644,425 | 2/1987 | Tamaki | 360/69 |
| 4,647,987 | 3/1987 | Nutting | 358/906 |
| 4,717,971 | 1/1988 | Sawyer | 358/342 |
| 4,752,834 | 6/1988 | Koomber | 358/335 |
| 4,800,376 | 1/1989 | Suga et al. | 340/721 |

Primary Examiner—Dale M. Shaw
Assistant Examiner—Phu K. Nguyen
Attorney, Agent, or Firm—Oliff & Berridge

[57] ABSTRACT

An image display system in which a plurality of magnetic recording/reproducing apparatus can be controlled via interfaces by a computer. The computer is adapted to output specification data for specifying one or more magnetic recording/reproducing apparatus to be controlled as well as control data including at least data on the shift of one or more magnetic recording/reproducing heads of the magnetic recording/reproducing apparatus to be specified. Each interface decodes the data input from the computer and transmits a given piece of control data to the magnetic recording/reproducing apparatus specified. The specified magnetic recording/reproducing apparatus shifts the magnetic recording/reproducing head in the radial direction of a rotating magnetic recording medium in accordance with the data on the shift of the magnetic recording/reproducing head applied through the above interface, and records signals into an arbitrary track or reproduces signals from an arbitrary track.

5 Claims, 19 Drawing Sheets

F I G. 10
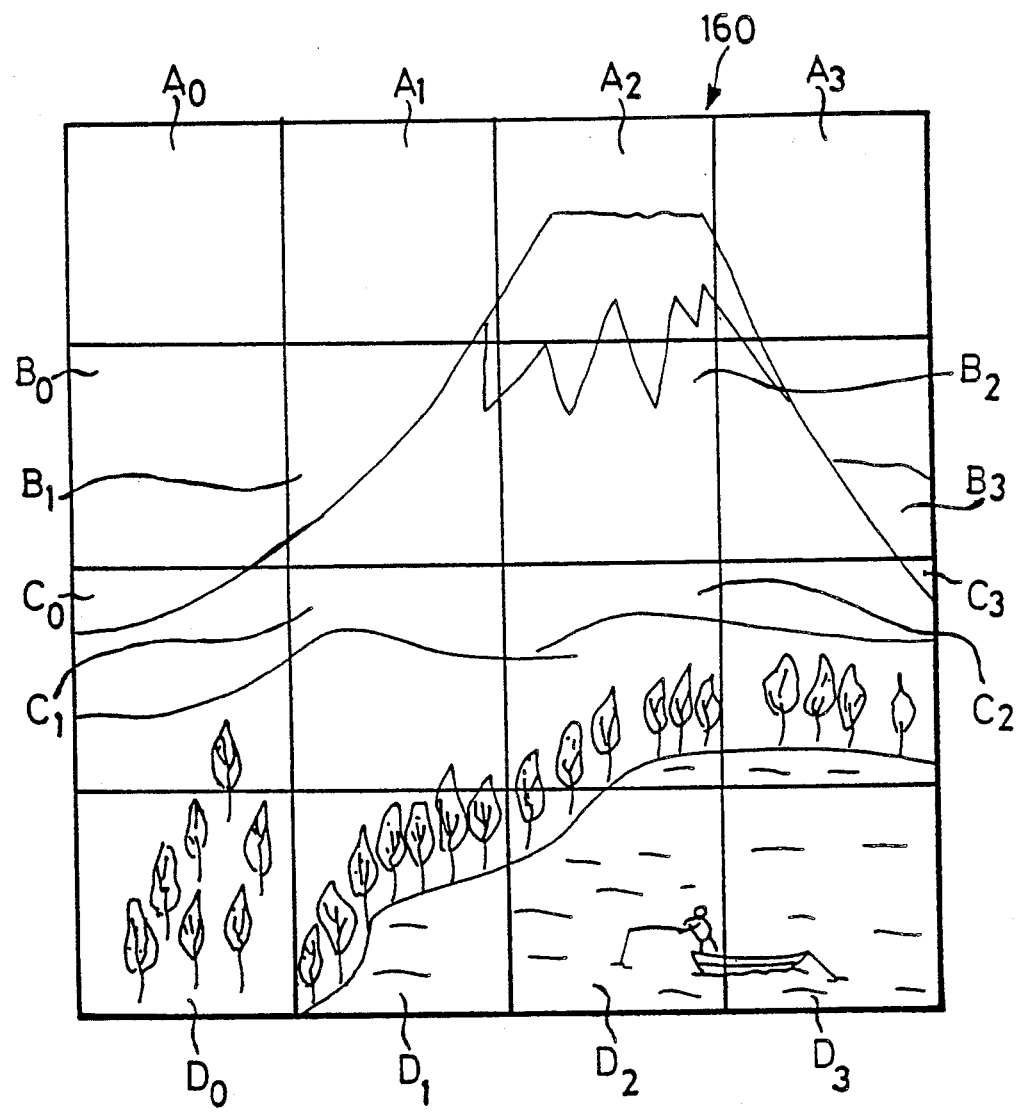

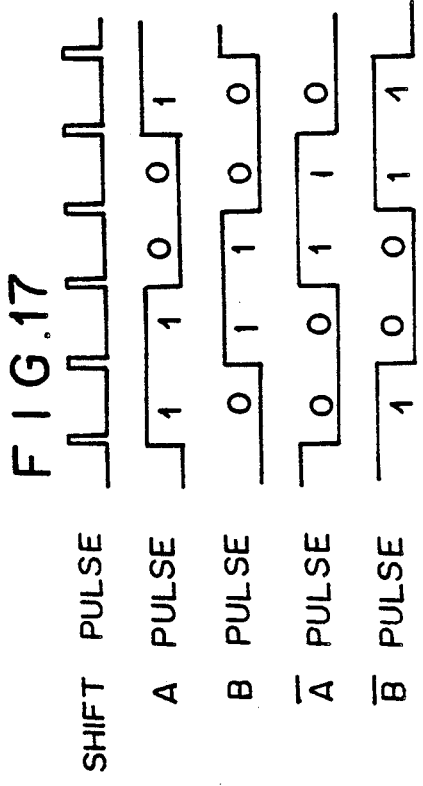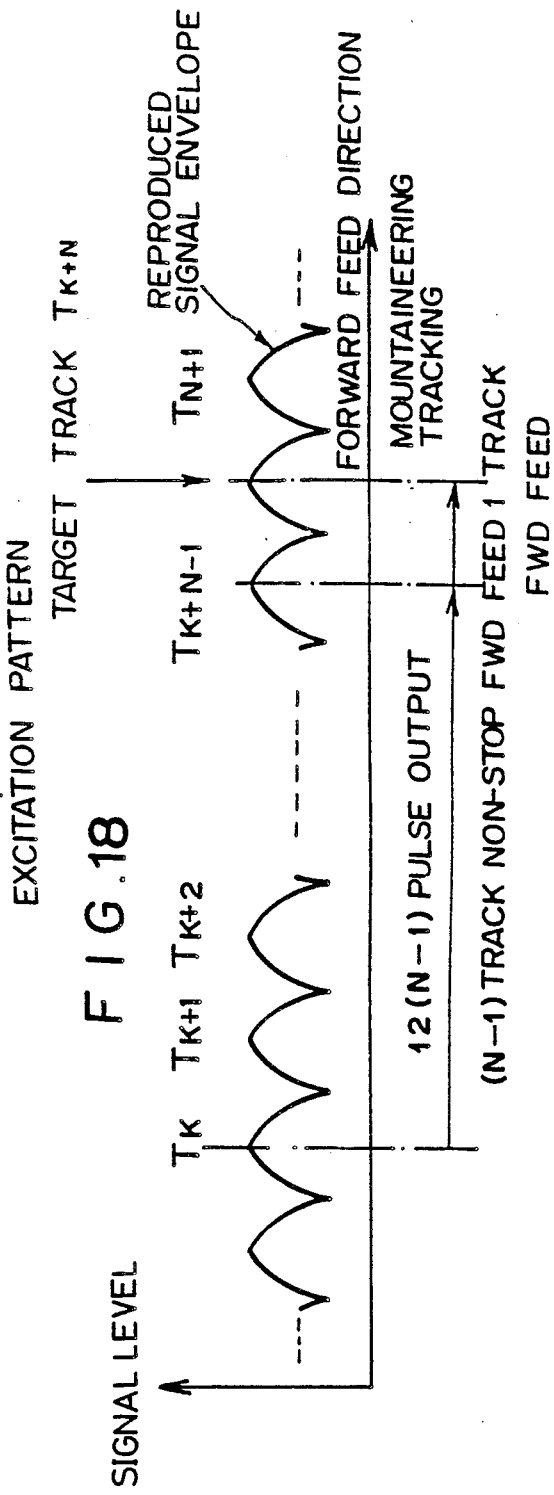

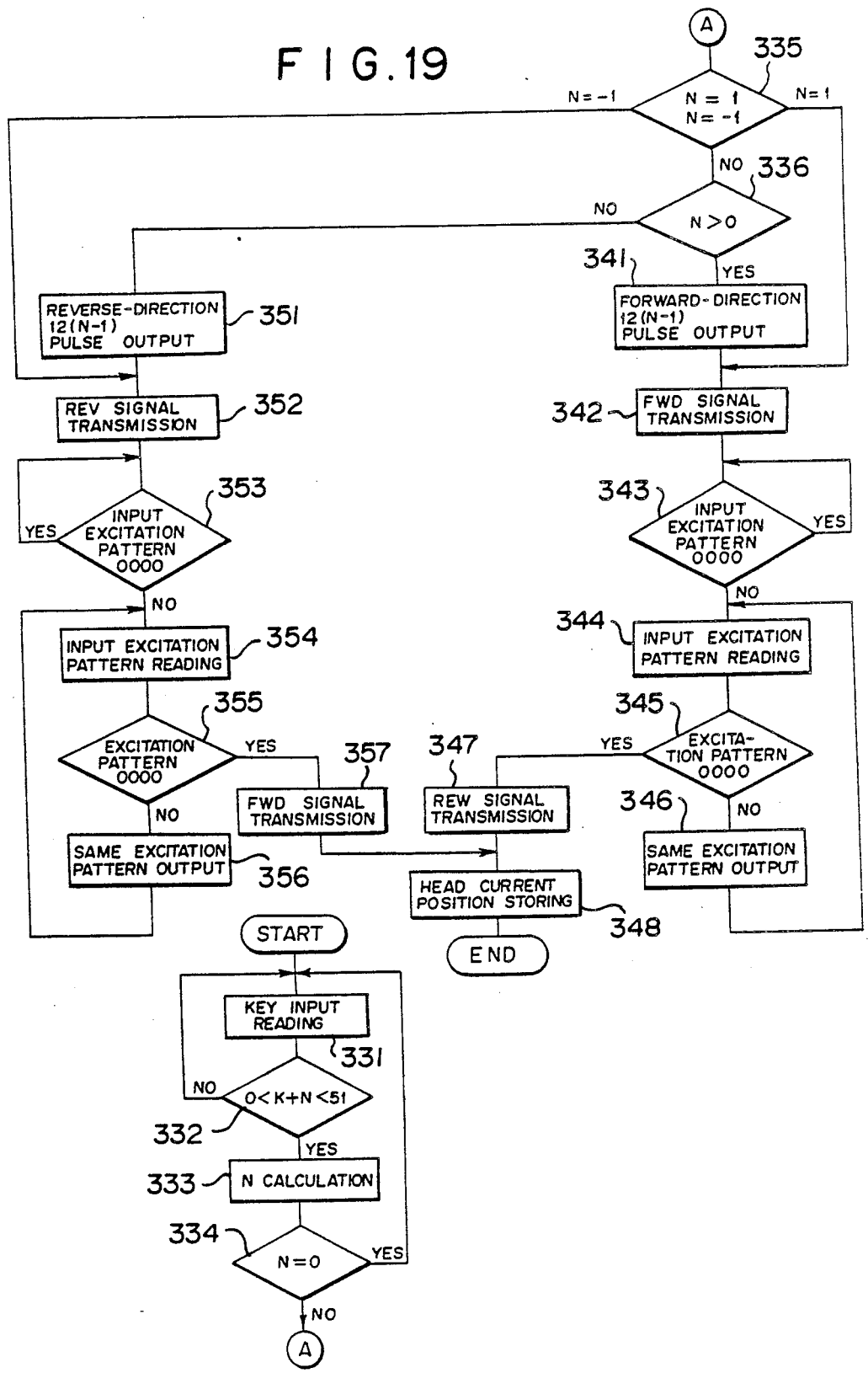

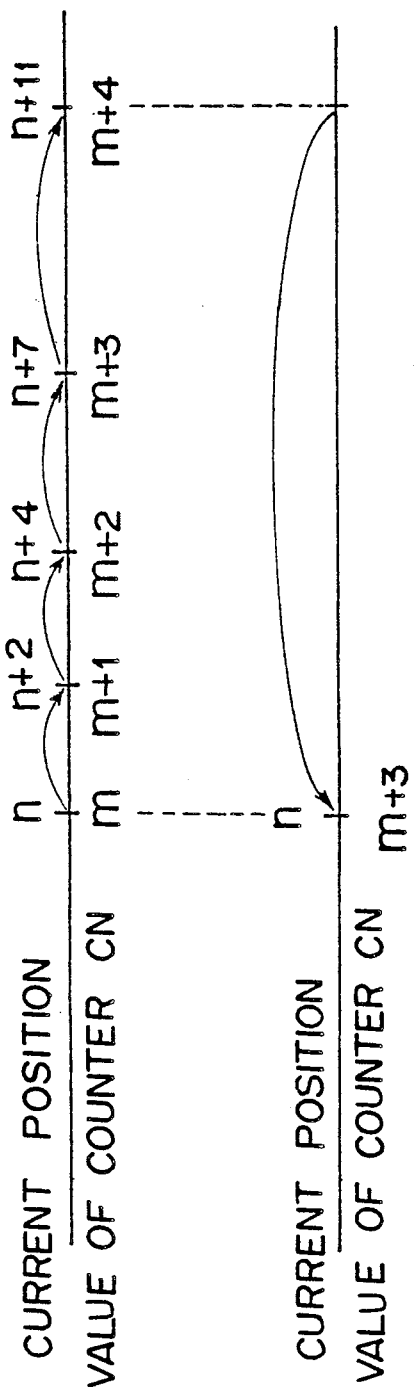

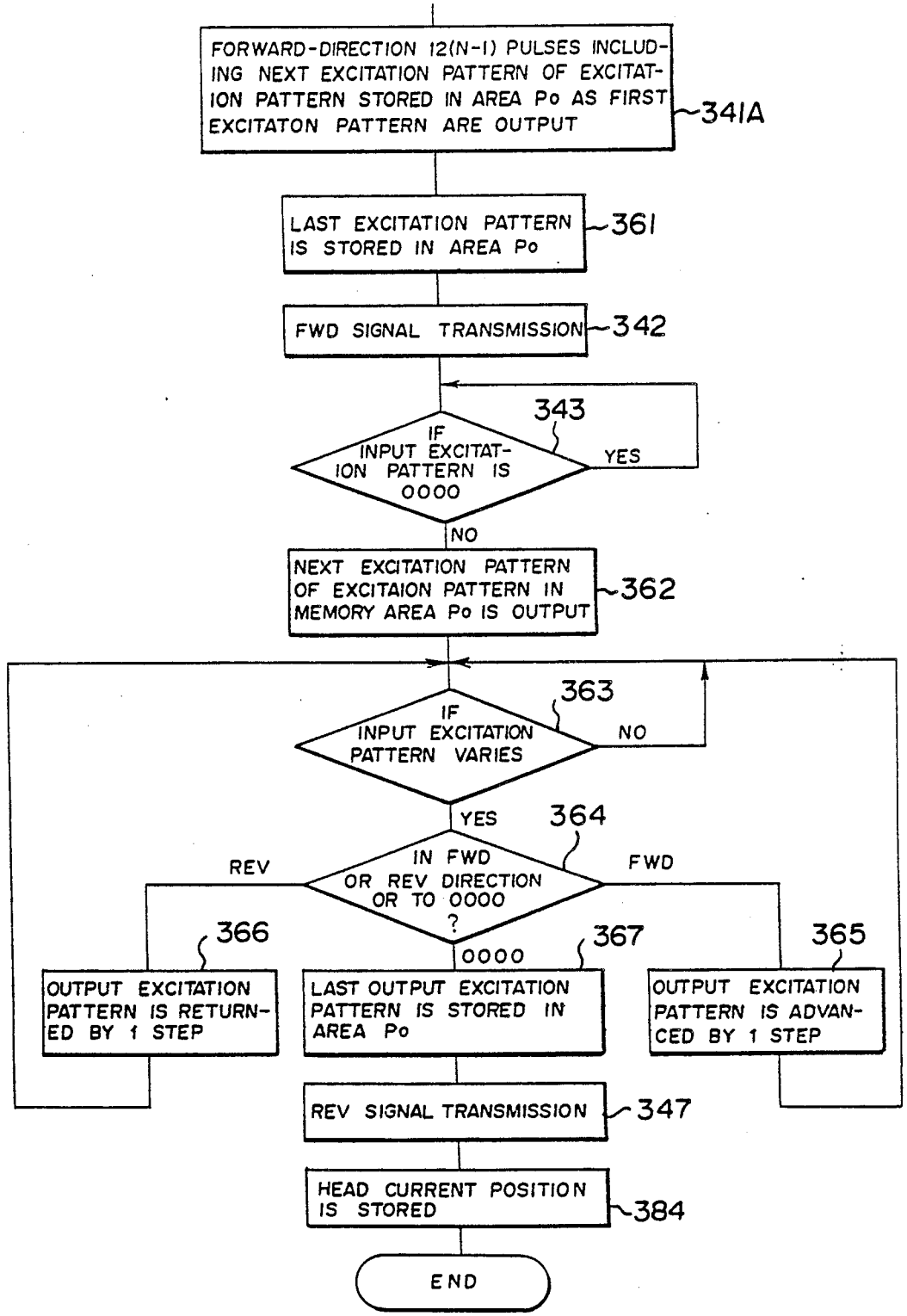
F I G. 21

IMAGE DISPLAY SYSTEM

This is a continuation of application Ser. No. 06/917,951 filed Oct. 14, 1986, now abandoned.

BACKGROUND OF THE INVENTION

1. Field of the Invention

The present invention relates to an image display system and, more particularly, to an image display system in which a plurality of magnetic recording/reproducing apparatus can be controlled en bloc by a computer so that these magnetic recording/reproducing apparatus can display desired images, respectively.

2. Description of the Prior Art

Recently, there has been developed an electronic still camera system which employs a combination of an image pickup device such as a solid image pickup element, an image pickup tube or the like and an inexpensive magnetic disk of a relatively larger memory capacity as a recording medium to photograph an object electronically and record the still image thereof on the magnetic disk, and which uses a separately arranged television system or a printer including a video signal reproducing device to reproduce the recorded image. Also, there has been realized a visual magnetic recording system which is adpated to photograph still images recorded in a visible recording medium such as an ordinary film, a printing paper or the like and to record these still images on a magnetic disk, as well as a video reproducing system including a video signal reproducing device which is adapted to read out video signals from a magnetic disk and display the readout video signals on a television or the like.

The above-mentioned magnetic recording/reproducing system in which a magnetic head is moved in the radial direction of a rotating magnetic disk to record a signal onto an arbitrary track or to reproduce a signal from an arbitrary track, especially the video signal reproducing system which reproduces video signals from the magnetic disk are now applied to various uses.

As a typical application thereof, it can be used as a process indicating medium in a line to manufacture and produce various kinds of products, semimanufactured goods and the like. In a conventional manufacturing and producing line, there are distributed for respective processes thereof process indicating papers, in each of which the contents of the operation to be performed in the process, precautions and other articles are stated. Even in the same line, since the contents of the operation and other articles are changed when the kinds of the products to be processed in the process, specifications thereof and the like are altered, the process indicating paper is replaced with another one whenever the contents of the operation in the process are changed.

The video signal reproducing system and a television system connected thereto are now in the limelight because they can replace the process indicating paper. The articles stated in the process indicating paper are now replaced by pictures displayed on a television screen. In other words, a magnetic disk is included in the video signal reproducing system, and video signals to generate pictures respectively representing the contents of the operation have been previously recorded in the respective tracks of the magnetic disk. And, each time the contents of the operation are changed, the track of the disk in which the images to be displayed on the television is specified to thereby display the instruction of the operation corresponding to the changed operation contents.

One set of a video signal reproducing system and a display device is arranged for each of the processes in a production line, and all video signal reproducing systems are collectively controlled by a central computer.

In another application, television display screens are arranged in a plane manner to form a multiple screen. Various kinds of guide information can be transmitted by use of the multiple screen or images representing advertisements, propaganda or the like can be displayed on the multiple screen. That is, the video signal reproducing system with a display device can be applied in supplying image information to a large number of people.

In such video signal reproducing system application systems, a plurality of video signal reproducing systems are controlled by a computer. Therefore, it is necessary to give individual instructions to the respective video signal reproducing system and also to address one or more video signal reproducing systems to be instructed.

SUMMARY OF THE INVENTION

It is an object of the present invention to provide an image display system which is capable of controlling a plurality of magnetic reproducing apparatus, such as the above-mentioned video signal reproducing apparatus, by use of a computer.

In order to accomplish the above object, according to one aspect of the present invention, there is provided an image display system which comprises: a plurality of magnetic recording/reproducing apparatus including a plurality of display devices and a plurality of video signal recording/reproducing means provided correspondingly to the respective display devices, each video signal recording/reproducing means being adapted to move a magnetic recording/reproducing head in accordance with data on movement of the magnetic recording/reproducing head to thereby record signals into an arbitrary track or reproduce signals from an arbitrary track; a computer which is adapted to output specification data for specifying one or more magnetic recording/reproducing apparatus to be controlled out of the above-mentioned plurality of magnetic recording/reproducing apparatus and control data including at least the data on movement of the magnetic recording/reproducing head of the specified magnetic recording/reproducing apparatus; and, a plurality of interfaces for connecting the above-mentioned plurality of magnetic recording/reproducing apparatus to the above-mentioned computer, each of the interfaces being provided so as to correspond to each of the plurality of magnetic recording/reproducing apparatus, each interface including decision means for deciding in accordance with the specification data from the computer whether the connected magnetic recording/reproducing apparatus is specified or not by the computer and control signal generating means for outputting to the connected magnetic recording/reproducing apparatus control data from the computer or data obtained by processing such control data so as to be readable by the above-mentioned magnetic recording/reproducing apparatus when the connected magnetic recording/reproducing apparatus is decided by the decision means that it is specified by the computer.

Also, according to another aspect of the invention, an instruction, which is given by the computer and is composed of a plurality of bits, includes a specification bit for specifying a magnetic recording/reproducing apparatus to be controlled and a control bit for controlling at least the movement of the magnetic recording/reproducing head of the magnetic recording/reproducing apparatus. And, the interface employed in the image display system according to the invention includes specification signal generating means which decodes the specification bit contained in the above-mentioned instruction and generates a specification signal, and control signal generating means which, when the specification signal is input, decodes the above-mentioned control bit and generates a control signal corresponding to the control bit for the magnetic recording/reproducing apparatus.

According to the present invention, since one instruction given by the computer is composed of the specification bit for specifying a predetermined one or more magnetic recording/reproducing apparatus and the control bit for controlling the magnetic recording/reproducing apparatus, a desired control of the magnetic recording/reproducing apparatus can be carried out by a single instruction.

The interface used in the image display system in accordance with the invention is capable of driving the magnetic recording/reproducing apparatus represented by a specification bit in an instruction issued from the computer since the interface includes means for decoding the specification bit in the above-mentioned instruction to output an apparatus specifying signal. Also, due to the provision of the above-mentioned control signal generating means which is adapted to be operated when the specification signal is input, with the present interface, the control bit contained in the instruction from the computer can be converted to a signal suitable for control of the magnetic recording/reproducing apparatus, permitting a proper control thereof.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 10 is a view to an example of a multiple screen provided by an image display system in accordance with the invention;

FIG. 17 is a waveform view to show a four-phase driving pulse and its associated exciting pattern;

FIG. 18 is a view to explain the principle of random access to tracks in a video signal reproducing apparatus;

FIG. 19 is a flow chart to show the random access processing procedures performed by a second control unit;

FIG. 20 is an explanatory view to illustrate a track No. counter in a first control unit; and, FIG. 21 is a flow chart to show the random access processing procedures.

DETAILED DESCRIPTION OF THE INVENTION

Detailed description will hereunder be given of the preferred embodiments of an image display system according to the present invention with reference to the accompanying drawings, the image display system incorporating an application of a video signal reproducing apparatus which is adapted to reproduce frequency-modulated video signals recorded in a magnetic disk. However, it should be noted here that the principle of the invention can also be applied to other applied systems of a plurality of video signal reproducing apparatus, applied systems of recording devices for recording given signals into a magnetic disk, and other kinds of computer systems.

General Structure of Image Display System

Figure 1:
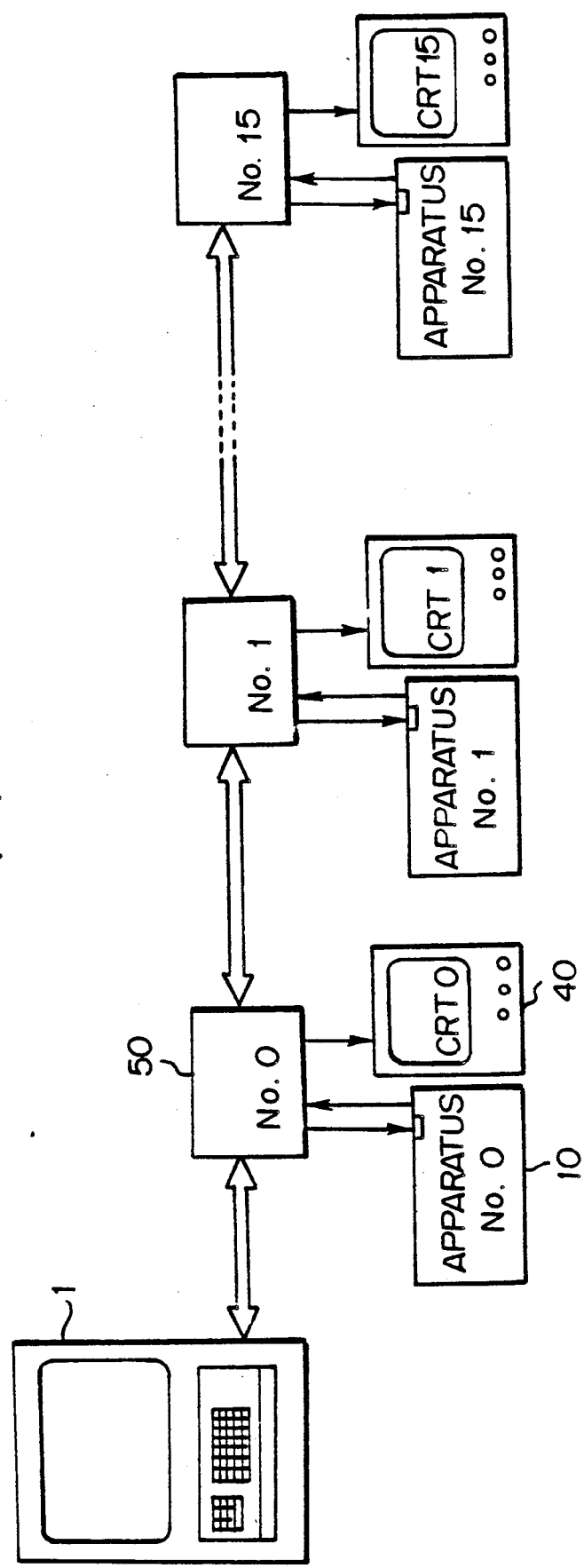
FIG. 1 is a block diagram to show a general outline of an example of an image display system to which a video signal reproducing apparatus is applied.

Referring first to FIG. 1, there is shown a general structure of an image display system according to the invention which incorporates an application of a video signal reproducing apparatus. The illustrated image display system is adapted to display, for example, the contents of the operation in the respective steps or processes included in the before-described production line.

Figure 16:
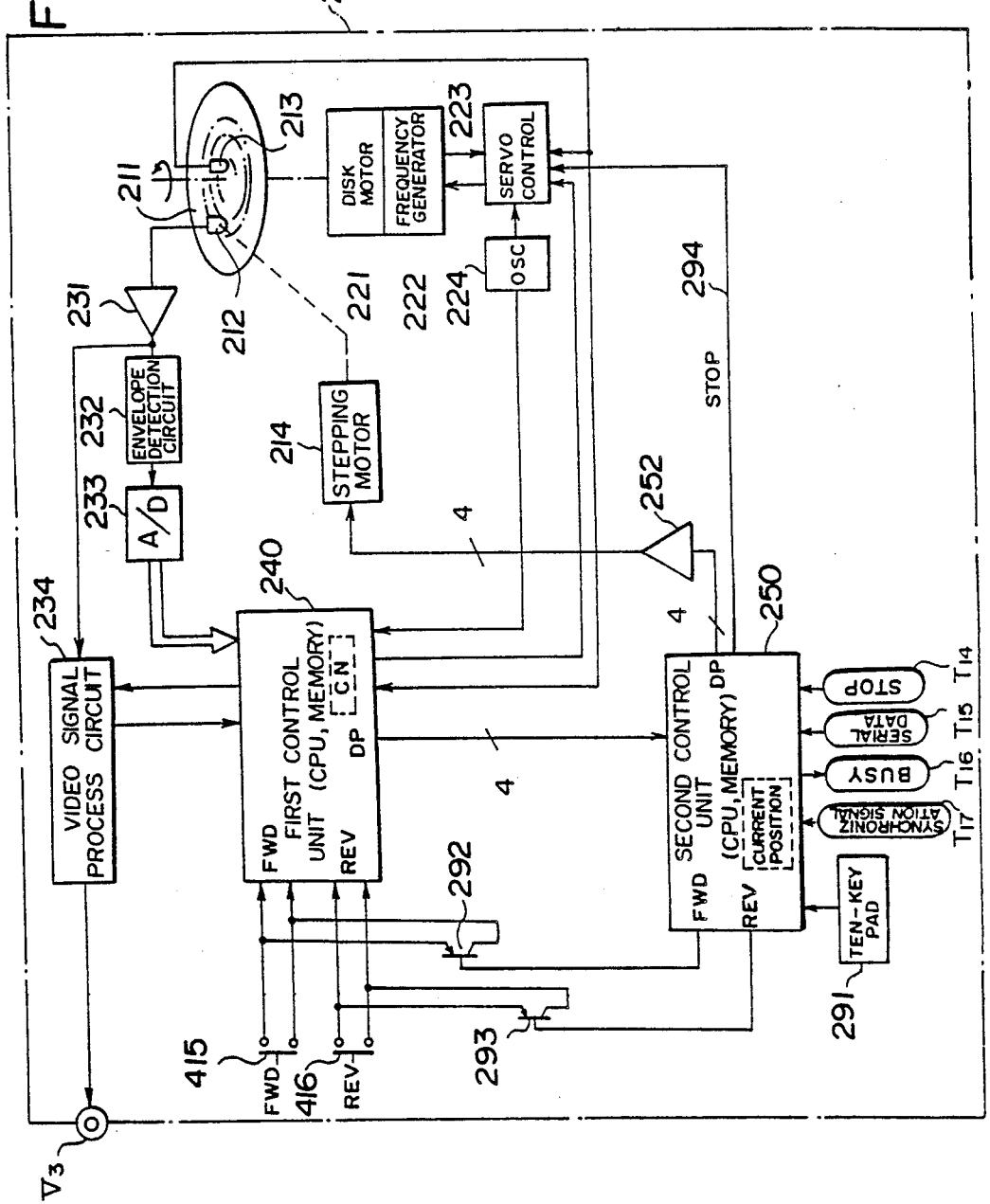
FIG. 16 is a block diagram to show the construction of a video signal reproducing apparatus.

Specifically, according to the invention, there are provided plural sets of, in FIG. 1 16 sets of video signal reproducing apparatus 10 and display devices 40. Apparatus Nos. including No 0~ No. 15 are given to the video signal reproducing apparatus 10, respectively. These apparatus sets are connected to a central computer 1, which is a small-type computer such as a so-called personal computer, via their associated interfaces 50 by bus lines, respectively. Since every kind of personal computer is equipped with a terminal for connecting a printer thereto, which is generally referred to as an electronics output terminal, it is preferred that this terminal may be used for connection of the apparatus set. This also can simplify a program for controlling the video signal reproducing apparatus on the side of the computer.

As will be described later in detail, various kinds of control signals (that is, forward feed, backward feed, and reset signals) are transmitted from Interface 50 to Apparatus 10, while burst gate signals are transmitted from Apparatus 10 to Interface 50. A standard television video signal, which is output from Apparatus 10, is once given to Interface 50 and it is then supplied from Interface 50 to Display Device 40. This operation is performed to control image mutation to be described later.

Figure 2:
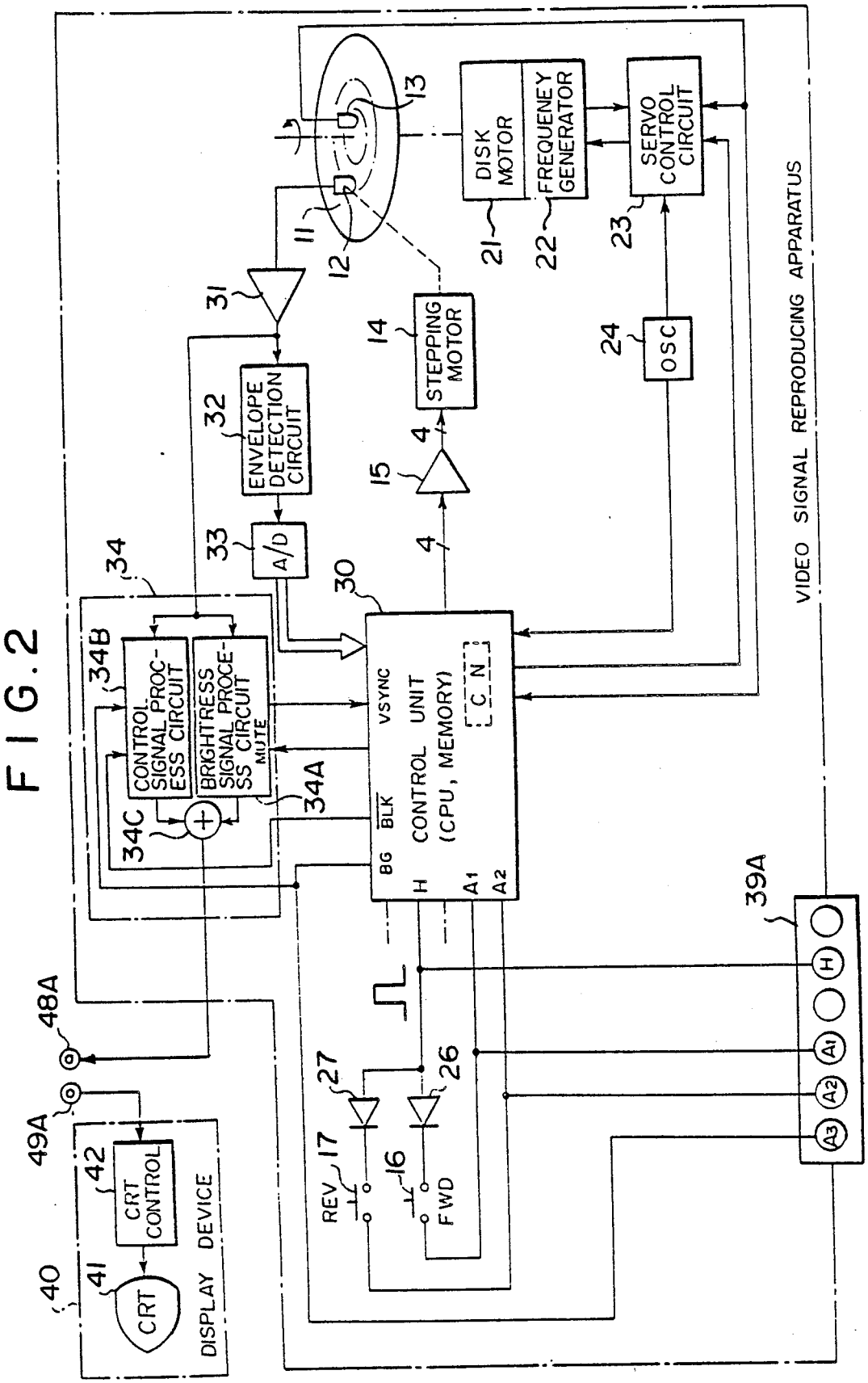
FIG. 2 is a block diagram to show the electric structure of the video signal reproducing apparatus and its associated television system.
Figure 3:
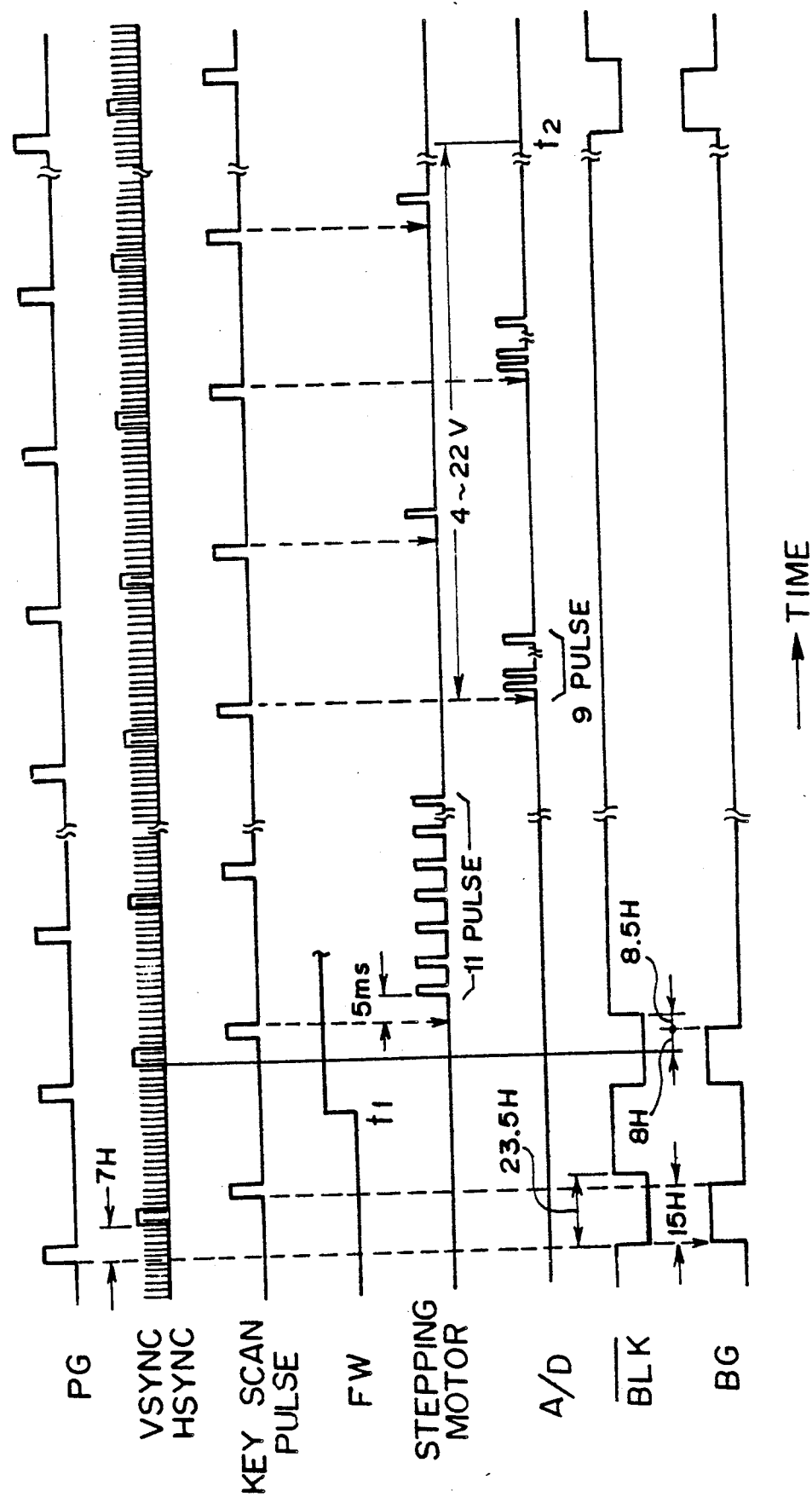
FIG. 3 is a timing chart to show the operation of a video signal reproducing apparatus.

Electrical Construction of the Video Signal Reproducing Apparatus and Display Device In FIG. 2, there is illustrated an electrical construction of the above-mentioned video signal reproducing apparatus 10 and display device 40. In FIG. 3, there is shown a timing chart which illustrates the operation of Video Signal Reproducing Apparatus 10.

Video Signal Reproducing Apparatus 10 is an apparatus which reproduces video signals recorded in a magnetic disk. The magnetic disk is provided with a plurality of (e.g., 50) tracks (each having a track pitch of 100 μm, for example) which extends concentrically with one another, and 1 field or 1 frame of frequency modulated color video signals (including brightness signals, chroma signals and the like) are recorded magnetically in each of the tracks. A magnetic reproduction head, which is adapted to read out the magnetically recorded video signals, is free to move in the radial direction of the magnetic disk and, when operated, accesses the track specified to read out from the rotating magnetic disk the video signals in the specified track of the magnetic disk.

A control unit 30, which is provided in Video Signal Reproducing Apparatus 10, is used to perform various kinds of processings, such as processings for reading the states of various switches including a forward feed switch 16, a backward feed switch 17, forward feed and backward feed processings including a tracking control to be explained later, processings for control of reproduction of the video signals, alarm processings and the like. Control Unit 30 comprises a central processing unit, preferably a micoroprocessor, (which will be hereinafter referred to as CPU), a memory which stores the program of the CPU and necessary data, and interfaces interposed among peripheral elements, circuits, devices and the like. Control Unit 30 is also provided with a counter CN for counting the position of the magnetic head, namely, the track No. thereof. As the counter CN, a given area of the memory may also be used.

A forward feed switch 16 for inputting a command to feed or move the magnetic head 12 by 1 track from the outside of the magnetic disk 11 to the inside thereof, a backward feed switch 17 for moving the magnetic head 12 in the opposite direction, a load switch (not shown) for detecting that a bucket provided in the video signal reproducing apparatus so as to be free to open and close is closed and thus locked, a pack switch (not shown) for detecting that the magnetic disk 11 is stored in the closed bucket, a home-position switch (not shown) to be explained later, and other switches are connected to Control Unit 30, while the on/off states of these switches are to be read in a key scan routine. There is also provided an alarm indication light (now shown) which can be turned on by a display command from Control Unit 30 under a predetermined condition.

Control Unit 30 has a terminal H for outputting a key scan pulse which is output at a timing shown in FIG. 3 each time the magnetic disk 11 is rotated. The above-mentioned forward feed switch 16 and backward feed switch 17 are connected to this terminal H respectively through backflow-preventing diodes 26, 27. Switches 16 and 17 are respectively connected to the input terminals A1 and A2 of Control Unit 30. When the key scan pulse is output, if Switch 16 is on, then Terminal A1 is in a high level during the time corresponding to the pulse width of the key scan pulse, with the result that Control Unit 30 recognizes that Switch 16 is on. If Switch 17 is on, then the pulse appears in Input Terminal A2. This input terminal A2 can also be used to input a reset signal, and if the input terminal A2 goes to a low level, then Control Unit 30 recognizes that the reset signal has been input. These two terminals A1, A2 are normally in the floating states, respectively.

Terminal H and Input Terminals A1, A2 are also connected to connectors provided in Video Signal Reproducing Apparatus 10, for example, the terminals H, A1, A2 of a socket 39A, as shown in FIG. 2.

Magnetic Disk 11 is mounted to a spindle of a disk motor 21, when the disk 11 is stored in the bucket and the bucket is closed and locked. The magnetic head 12 is arranged in contact with the magnetic record surface of the magnetic disk 11 in such a manner that it is free to move in the radial direction of the magnetic disk 11. Also, there is provided a phase detector 13 in contact with the core of the magnetic disk 11. This phase detector 13 serves to detect magnetic substances provided in the magnetic disk core and generate one pulse (as shown by PG in FIG. 3) per rotation of the magnetic disk 11.

Disk Motor 21 is equipped with a frequency generator 22 for generating a signal of a frequency proportional to the number of rotations of the disk motor 21, and the output frequency signal is fed back to a servo control circuit 23. The detection pulse PG from Phase Detector 13 is also input to Servo Control Circuit 23 and Control Unit 30. A reference clock pulse generator 24, which is designated by OSC in FIG. 2, generates a reference signal of 60 Hz equal to the field frequency of a raster scan video signal recorded in the magnetic disk 11 and transmits it to the servo control circuit 23, while it supplies a clock pulse of high speeds, for example, a clock pulse of 3.58 MHz. In accordance with these input signals, Servo Control Circuit 23 controls the disk motor 21 so that the motor 21 rotates at a given number of rotations, for example, 3,600 r.p.m.. Also, Servo Control Circuit 23 is able to start or stop the motor 21 in accordance with the commands from Control Unit 30.

Magnetic Head 12 is supported movably in the radial direction of the magnetic disk 11 and can be moved and controlled in such direction by a shift/drive device including the stepping motor 14. A drive pulse having four phases A, $\overline{A}$, B, $\overline{B}$ is given by a drive circuit 15 to the stepping motor 14, control of which, for shift of the magnetic head 12, will be described later. The direction of rotation of the stepping motor 14 determines the direction of shift of the magnetic head 12, and the distance of shift of the magnetic head 12 is directly proportional to the angle of rotation thereof. For example, the motor is rotated about 30° for each shift pulse (which is assumed to be generated for each phase shift of the above-mentioned drive pulse) given to the stepping motor, with the result that the magnetic head 12 is shifted about 8.4 μm. That is, 12 shift pulses can shift the magnetic head 12 almost 1 track (100 μm).

The magnetic head 12 reads out the video signals recorded in the tracks on the magnetic disk 11, at places where the head is positioned. In this embodiment, since the magnetic disk 11 is constantly rotated at the speed of 3,600 r.p.m., the video signals corresponding to one track, that is, the frequency modulated video signals corresponding to one field per rotation of 1/60 sec. are reproduced by the magnetic head 12. By means of demodulation, this embodiment is compatible with a standard color television system such as NTSC system and the like.

The reproduced outputs of the magnetic head 12 are transmitted via a preamplifier 31 to a video signal processing circuit 34 and an envelope detection circuit 32. Video Signal Process Circuit 34 is adapted to process the video signals read out by the magnetic head 12 and thereby output them in the form of, for example, composite color video signals for the NTSC format. More particularly, Video Signal Process Circuit 34 comprises a brightness signal process circuit 34A, a color signal process circuit 34B, and a composite circuit 34C which combines the outputs of these two circuits.

Brightness Signal Process Circuit 34A is adapted to process the brightness signal component and synchronizing signal component of the video signals reproduced by the magnetic head 12 for compatibility with the NTSC format. Circuit 34A also extracts a vertical synchronizing signal VSYNC out of the video signal to supply it to Control Unit 30, and, on receiving a signal "MUTE" from Control Unit 30, considers the scanning period of the video signal as a blank signal to thereby carry out a muting operation. The timing of the vertical synchronizing signal VSYNC is illustrated in FIG. 3 in which a horizontal synchronizing signal is also shown.

Color Signal Process Circuit 34B is a circuit which demodulates the color signal component out of the video signal and performs balance modulation as well as superposition of the color burst for compatibility with the NTSC format. A vertical retrace erase signal $\overline{BLK}$ and a burst gate signal BG are given to Color Signal Process Circuit 34B from Control Unit 30. In accordance with the burst gate signal BG, Color Signal Process Circuit 34B controls whether the superposition of the color burst signal on the composite color video signal is inhibited or allowed.

In other words, in a normal state in which Magnetic Head 12 is staying on a given track of the magnetic disk 11, Control Unit 30, as shown in FIG. 3, creates and outputs the vertical retrace erase signal $\overline{BLK}$ and the burst gate signal BG at a given timing in accordance with a phase synchronizing pulse PG. While the burst gate signal BG is being applied to Color Signal Process Circuit 34B, the color burst signal will not be superposed on the pack porch of the horizontal synchronizing signal of the video signal.

As will be described later, while Magnetic Head 12 is performing a forward and rearward feed control (a tracking control), the burst gate signal BG will not be output from Control Unit 30. In this case, as will be explained afterwards, the burst gate signal BG is maintained in a low level, and the vertical retrace erase signal $\overline{BLK}$ in a high level (FIG. 3).

The burst gate signal BG is also fed to the terminal A3 of the connector 39A for connection with Interface 50.

The brightness and color signals output from the above-mentioned circuits 34A and 34B are combined with each other in Composite Circuit 34C to create a composite color video signal, and, consequently, the composite color video signal is transmitted from the output terminal 48A of Composite Circuit 34C through Interface 50 to Color Display Device 40 via the input terminal 49A thereof.

Referring to FIG. 3, H represents a time from the beginning of one (horizontal) scan line to the beginning of the next scan line, and V stands for a time from the beginning of one field to the beginning of the next field.

The color video signals output from Video Signal Process Circuit 34, as described above, are delivered to Color Display Device 40 which is equipped with a cathode-ray tube display means (which will hereinafter be referred to as a CRT) 41 and a CRT control circuit 42 including a demodulation circuit and the like, so that the video signals recorded on the magnetic disk 11 will be visually displayed on CRT 41. If necessary, the then value of the counter CN, that is, the track No. of the current position may be transmitted to Display Device 40 from Control Unit 30, so that the track No. can be displayed on CRT 41.

An envelope detection circuit 32 is a detection circuit which detects the read signal of the magnetic head 12, that is, the envelope (enveloping line) of the frequency modulated video signal recorded in the track of the magnetic disk 11 and outputs a voltage signal corresponding to the detected envelope. The voltage signal representing the envelope is transmitted to an analog/digital converter (A/D Converter) 33, where it is converted to, for example, an 8-bit digital signal representing a quantization level of 256 and is then input to Control Unit 30.

The envelope detection signal is used to search the tracks on the magnetic disk 11. When the magnetic head 12 is moved in the radial direction of the magnetic disk 11 to reach a position in which the detection signal shows its peak, then the position is the center of the track in which the video signal is recorded. Control Unit 30 controls the above-mentioned magnetic head shift/drive device in accordance with the 8-bit digital signal input thereto to position the magnetic head 12 on the center of a given track. This is called a tracking control.

Figure 4:
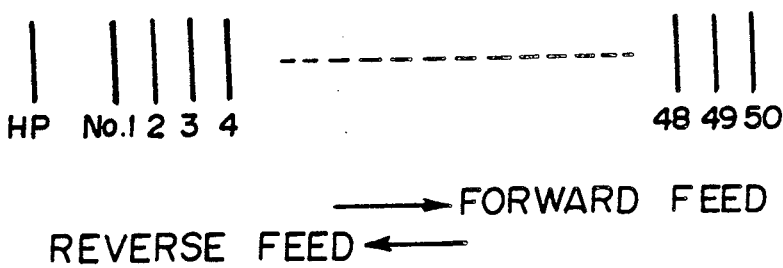
FIG. 4 is a view to show the arrangement of tracks of a magnetic disk and the home position of a magnetic head.

In FIG. 4, there is shown a relationship between the tracks provided on the magnetic disk 11 and a home position HP (a position of an original point or a waiting position) of the magnetic head 12. On the magnetic record surface of the magnetic disk there are provided 50 tracks extending concentrically with track Nos. being given to 50 tracks in the order of No. 1 ~ No. 50 from the outside thereof, respectively. The home position HP is located outside of the track of No. 1. This home position HP is not provided in Magnetic Disk 11, but it is a limit position allocated on the moving passage of the magnetic head 12. The home position HP can be detected by the above-mentioned home position switch. The movement of the magnetic head 12 from the outside of the magnetic disk 11 toward the inside thereof is the forward feed of the disk 11, and the opposite movement thereof is the backward feed thereof.

Operation of Video Signal Reproducing Apparatus

Among the operations of the video signal reproducing apparatus, description will be given of a initial tracking process associated with the control by Computer 1 as well as of forward control and backward control processes.

In the initial tracking process, the magnetic head 12 is first returned to the home position HP, the magnetic head is then moved in the forward direction from this home position HP, and, while searching the center of the No. 1 track, the magnetic head 12 is positioned on the center of the No. 1 track. As a result of this, the count value of Counter CN for counting the track Nos. is initialized to 1. The initial tracking process is performed when the power switch is turned on or when the reset signal is input.

Figure 5:
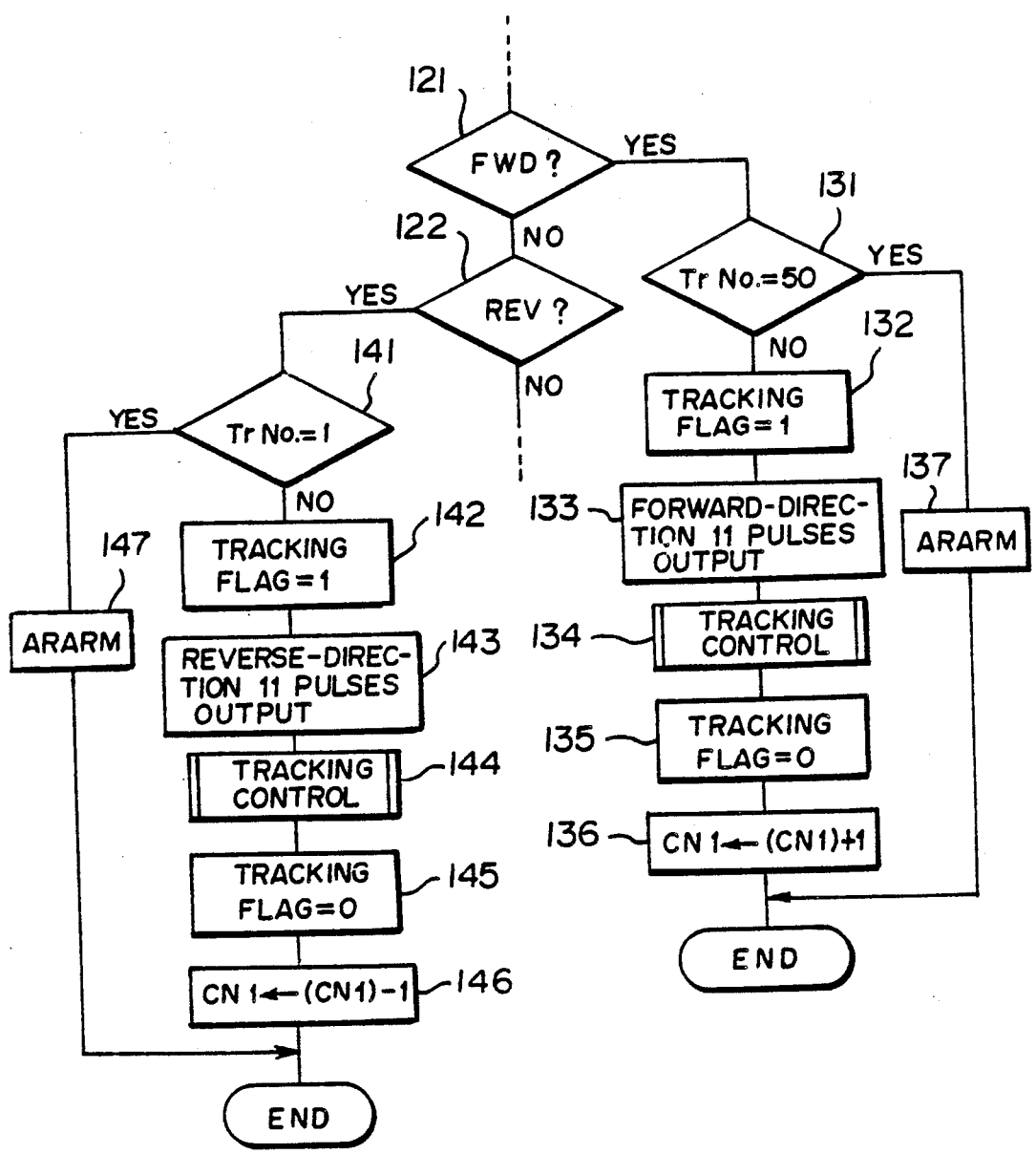
FIG. 5 is a flow chart to show a part of processing procedures of a video signal reproducing apparatus.

In FIG. 5, there is shown a flow chart which illustrates the general outline of the forward feed and backward feed processes as well as the tracking process.

Control Unit 30, as described above, outputs the key scan pulses at a given cycle to sense the switching states of the forward feed signal (Switch 16), backward feed signal (Switch 17), and other signals.

As a result of this, when the forward feed signal (designated by FW in FIG. 3) is sensed (that is, YES in Step 121, and, in FIG. 3, at the first scan after Time t1), the following forward feed and tracking processes are carried out.

If the value of Track No. Counter CN is not 50 (that is, NO in Step 131), the tracking flag is then set to 1 (Step 132), and, in order to move the magnetic head 12 in the forward direction up to a position adjacent to the center of an adjoining track, variations of the drive pulse corresponding to 11 shift pulses in the forward direction are given to the stepping motor 14 (Step 133). And, the then output of Envelope Detection Circuit 32 is to be read out. Such readouts are performed, for example, 9 times, and the average value of these readouts is calculated. Then, one more forward shift pulse is output to sense the envelope level in a similar manner. If a significant difference is not found between the former and latter envelope levels (that is, the above-mentioned average values), then while switching the shift direction of the magnetic head 12 in the forward or backward direction the adjacent envelope levels are searched a large number of times to confirm that there is no significant difference among the respective envelope levels. Based on this confirmation, this position is decided as the center of the track and the magnetic head 12 is then positioned there. If any significant difference is found between the former and latter envelope levels, then the magnetic head 12 is further moved by 1 shift pulse in the direction of the larger envelope level and a similar process is repeated. This is the tracking control process in Step 134. The tracking control process, in FIG. 3, is to be completed at Time t2.

When the envelope level is a given threshold level or less, it is decided that no video signals are recorded in the track.

Finally, the tracking flag is reset to 0 (Step 135) and the value of Track No. Counter CN is incremented by 1 (Step 136).

When the value of Track No. Counter CN has reached 50, the forward feed is impossible, so that an alarm process is carried out by turning on the above-mentioned alarm display light, buzzing a buzzer or similar means (Step 137).

When the backward feed signal is detected (that is, YES in Step 122), processings for the backward direction similar to the above-mentioned processings are performed (Steps 142, 143, 144, 145). The value of Counter CN is decremented by 1 (Step 146). And, in the case of CN=1, alarm processings are carried out (Steps 141, 147).

During such forward feed or backward feed processings (including the tracking control processings), that is, while the tracking flag is being set to 1 (e.g., in FIG. 3, during the time period from the first key scan after Time t1 to Time T2), the vertical retrace erase signal $\overline{BLK}$ is maintained in the high level and the burst gate signal BG is maintained in the low level.

In the above-mentioned initial tracking processing as well, during the tracking processing, the burst gate signal BG is maintained in the low level, and, when the magnetic head 12 is positioned on the No. 1 track, then it is in the high level during a given period for each rotation of the magnetic disk 11.

Construction of Control Code

Figure 6:
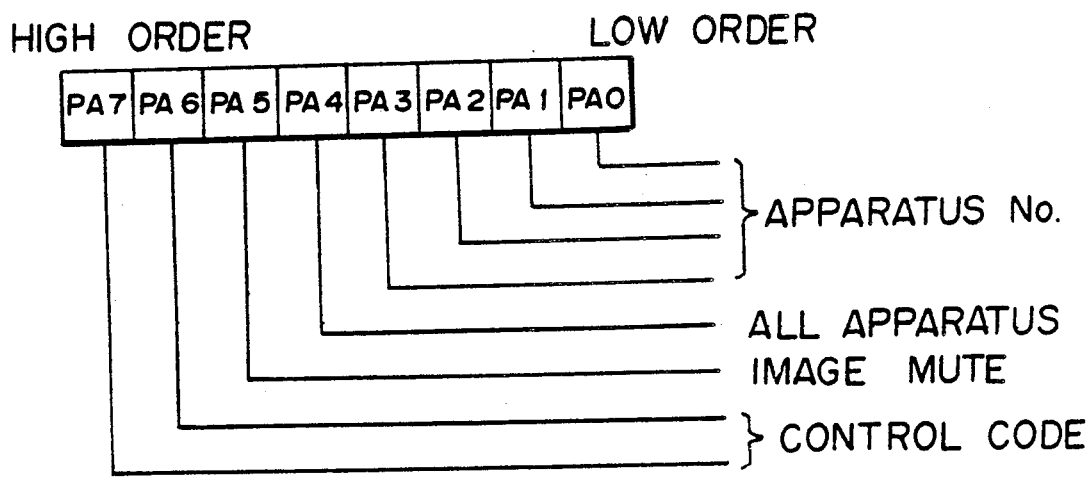
FIG. 6 is a view to show the construction of control codes.

A control code, which is output from Computer 1 to the bus line so as to control 16 video signal reproducing apparatus 10, is composed of 8 bits and each of the 8 bits, as shown in FIG. 6, has its own peculiar meaning.

In other words, the lower 4 bits PA0~PA3 are used to specify (address) the 16 apparatus 10. Specifically, these four lower bits specify the apparatus 10 of No. 0~No. 15 by means of 0000~1111.

The fifth bit PA4 is used to specify all of the 16 apparatus 10 at the same time. When this bit PA4 is in the high level (=1), all apparatus 10 are accessed and controlled at the same time, regardless of the values of the lower 4 bits PA0~PA4.

Other various ways can be employed to specify a plurality of video signal reproducing apparatus 10. For example, when the number of the apparatus 10 is 5 or less, the respective bits may be adapted to correspond to the respective apparatus 10 in one to one manner so that, for instance, the No. 0 apparatus can be specified by the lower-most bit PA0, the No. 1 apparatus can be specified by the second-lowest bit PA1, and so on. This way of specification has an advantage that arbitrary combinations of apparatus can be accessed at the same time by an arbitrary number of bits.

The sixth bit PA5 is used to perform an image muting operation. If this bit PA5 is 1, then the screen of CRT 41 of Display Device 40 corresponding to the apparatus 10 to be specified by the lower bits PA0~PA3 is maintained in a black (or white) level, with the result that no images will appear on the screen.

Figure 7:
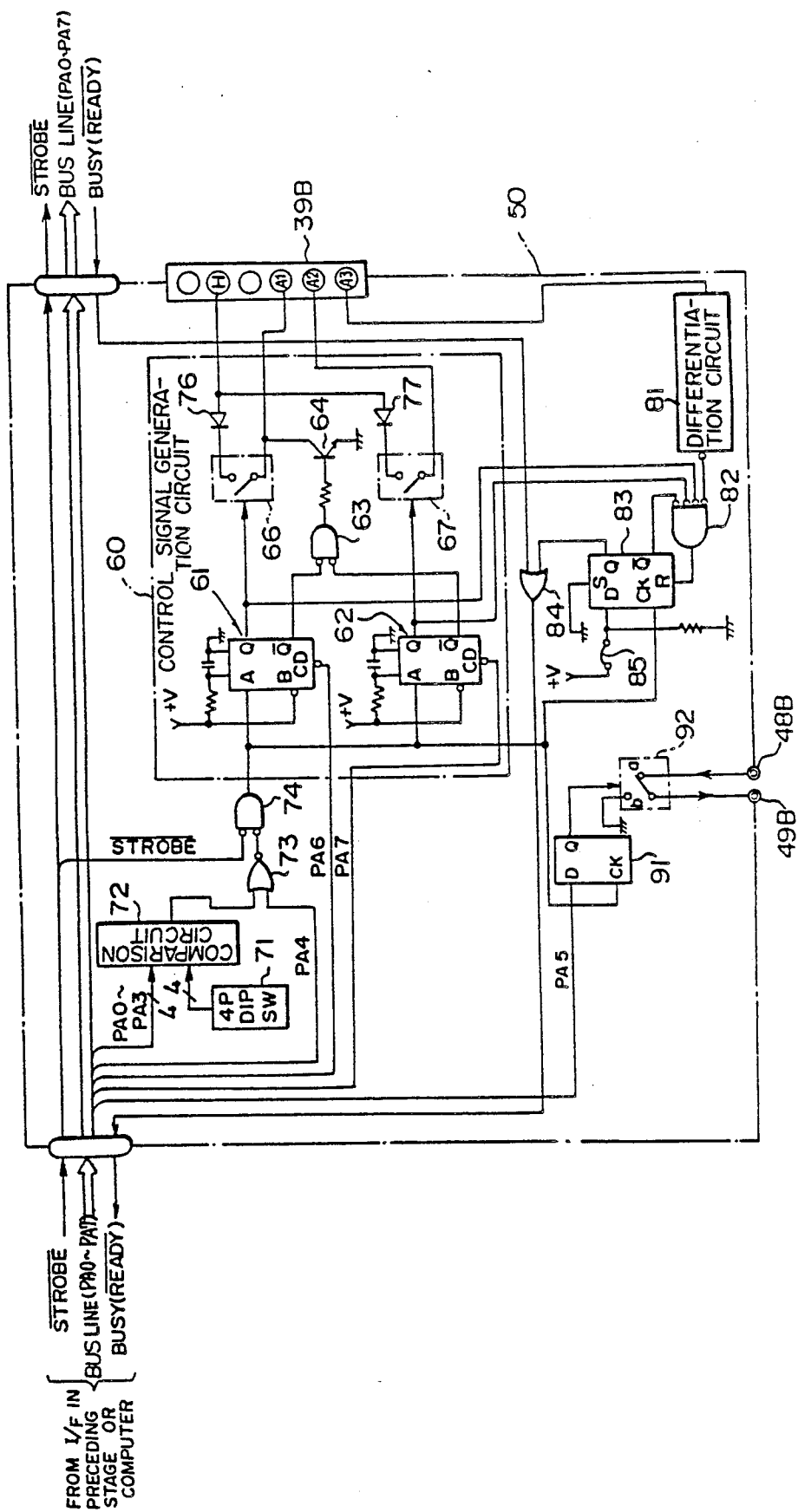
FIG. 7 is a circuit diagram to show the construction of an interface employed in the invention.
Figure 8:
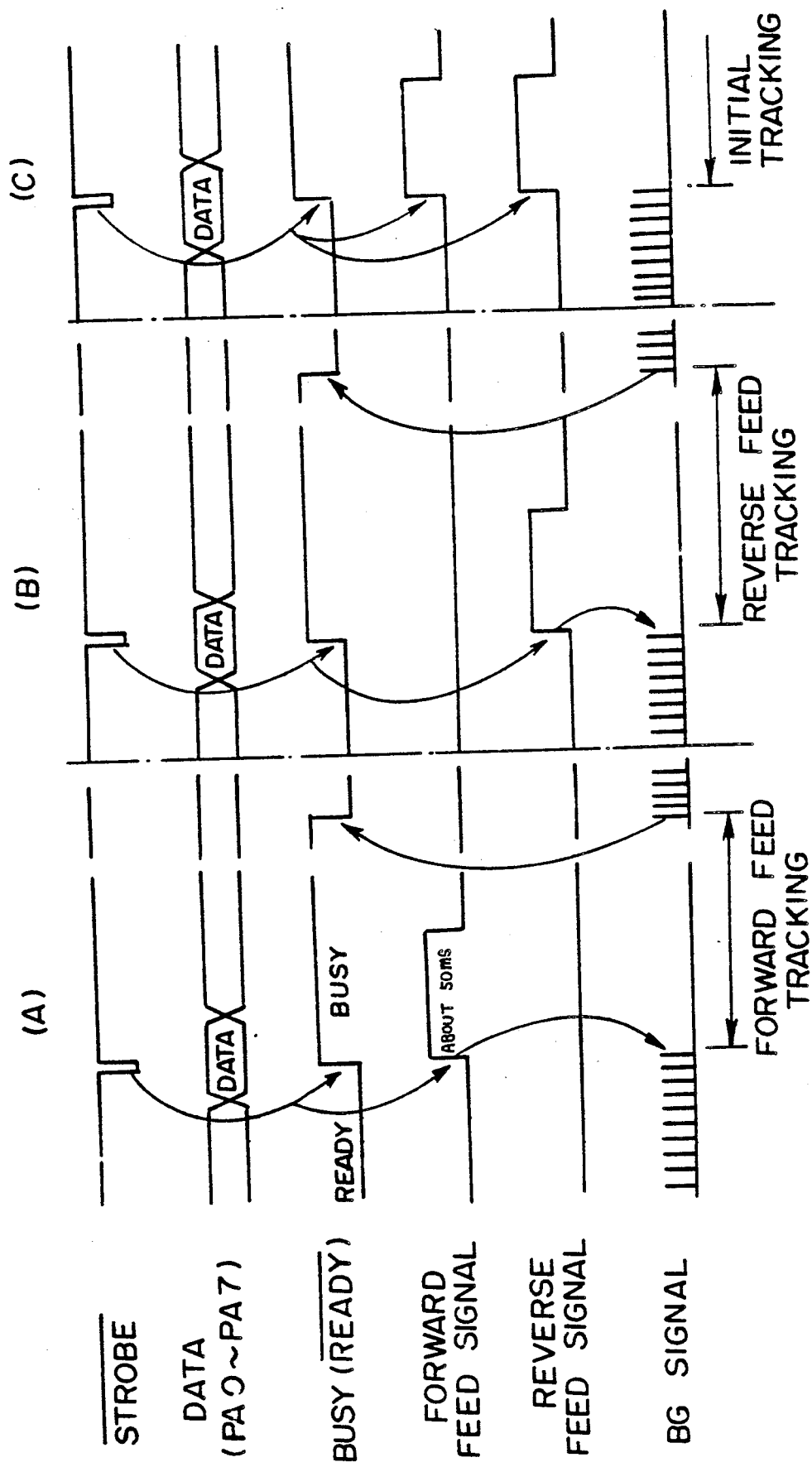
FIG. 8 is a timing chart to show the operation of the above-mentioned interface of the invention.

The upper or higher two bits PA6 and PA7 are respectively control bits which are used to move the magnetic head 10 of the video signal reproducing apparatus 10 and have following functions:

PA6=1, PA7=1—Reset
PA6=1, PA7=0—Forward Feed
PA6=0, PA7=1—Backward Feed
PA6=0, PA7=0—Invalid Construction and Operation of Interface In FIG. 7, there is shown a contruction of the inter face according to the invention, while in FIG. 8 there is shown an example of the operation of the interface.

A strobe signal $\overline{STROBE}$ and data signals (control codes AO1~AO7), which are sent from Computer 1 or an interface in the preceding stage, go to an interface in the next stage. A busy signal BUSY or a ready signal $\overline{READY}$ is transmitted from the next-stage interface to the preceding-stage interface or Computer 1.

In a circuit arrangement shown in FIG. 7, there are illustrated in slight detail a control signal generation circuit 60 for generating the forward feed, backward feed and reset signals as well as a circuit for creating a busy signal BUSY from the burst gate signal BG.

For purposes of clarification of its connecting relationship with the video signal reproducing apparatus 10, at first, description will be given of a portion of the control signal generation circuit 60.

A connector, for example, a plug 39B is connected to the connector 39A of Video Signal Reproducing Apparatus 10. The control bits PA6, PA7 are decoded to create a forward feed signal which in turn controls, that is, turns on a switch 66. The switch 66 is connected between the terminals H and A1 of the connector 39B through a reverse-current preventing diode 76. The control bits PA6, PA7 are likewise decoded to create a backward feed signal which in turn controls a switch 67. The switch 67 is connected between the terminals H and A2 of the connector 39B via a diode 77. Therefore, when the connector 39A of Video Signal Reproducing Apparatus 10 and the connector 39B of Interface 50 are connected with each other, the switch 66 is brought into parallel connection with the forward switch 16 and the switch 67 is brought into parallel connection with the switch 17. For the switches 66, 67, analog switches, semiconductor switching elements and other switching members can be used.

Thus, when the switch 66 or 67 is on, if the above-mentioned key scan processing is carried out in Video Signal Reproducing Apparatus 10, then Control Unit 30 within Apparatus 10 recognizes as if the forward feed switch 16 or the backward feed switch 17 were on and performs the above-mentioned forward feed or backward feed processing.

Between the terminal A1 and a ground is connected a transistor 64. This transistor 64 is controlled or turned on by a high-level reset signal which is created by NAND Circuit 63. When the reset signal is output, then the transistor 64 is turned on, with the result that the input terminal A1 of Control Unit 30 in Video Signal Reproducing Apparatus 10 goes to the low level by means of the terminals A1 of the two connectors 39A and 39B and thus Control Unit 30 recognizes the reset input.

In this manner, in accordance with the external input, that is, the command from Computer 1, it is possible to start the forward feed, backward feed and reset processings of Video Signal Reproducing Apparatus 10.

The burst gate signal BG, which is output periodically after completion of these processings, is input to the interface 50 from the terminal A3 of the connector 39B.

Now, the interface 50, which is connected with the respective video signal reproducing apparatus 10, is equipped with a setting device 71 in which the apparatus Nos. (0~15) of the corresponding apparatus 10 are set. This setting device 71 is composed of, for example, 4 dip switches and the 4-bit setting outputs thereof are input to a comparison circuit 72. To the comparison circuit 72 are also connected the lines of the lower 4 bits PA0~PA3 out of the data bus. Therefore, when the control code data is loaded on the data bus, if the apparatus No. represented by the lower 4 bits PA0~PA3 coincides with the apparatus No. set in the setting device 71, then Comparison Circuit 72 issues a high-level coincidence output which is then applied to one of the input sides of NOR Circuit 73.

To the other input side of NOR Circuit 73 is connected the line of the fifth bit PA4. Therefore, when the coincidence output is issued from Comparison Circuit 72 or PA4=1, then the output of NOR Circuit 73 goes to the low level. This corresponds to a case where the apparatus is specified by the lower 4 bits or a case where all of the apparatus are specified by the fifth bit. The output of NOR Circuit 73 is a signal to specify the corresponding apparatus and it also indicates that Computer 1 is accessing.

The output of NOR Circuit 73 is input to one of the input sides of AND Circuit 74, while a strobe signal $\overline{\text{STROBE}}$ is input to the other input side of AND Circuit 74. Therefore, when the output of NOR Circuit 73 goes to the low level and the strobe signal $\overline{\text{STROBE}}$ falls, then AND Circuit 74 issues a positive pulse which is then transmitted to the trigger input terminals A of one-shot multivibrators 61, 62 as well as to the clock input terminals CK of flipflops 83, 91 to be described later.

One-shot Multivibrator 61 includes an operation inhibition (that is, chip diable) terminal CD, to which is connected the line of 1 bit PA6 out of the higher 2 bits. When this bit PA6 is 1, this chip is operable. For this reason, in the case of Bit PA6=1 (forward feed or reset), if a positive inpulse is input to the trigger input terminal A, then a positive pulse of, for example, about 50 mS is being issued for a given period of time from the positive output terminal Q of Multivibrator 61 and a negative pulse is being issued likewise from the reverse output terminal thereof.

Since Bit PA7 is being input to the terminal CD of the other one-shot multivibrator 62, in the case of PA7=1 (backward feed or reset), if a positive pulse is input to the trigger input terminal A thereof, then a positive pulse is output from the output terminal Q thereof and a negative pulse from the output terminal $\overline{Q}$ thereof.

In the case of a forward feed instruction, that is, PA6=1, PA7=0, a positive pulse of about 50 mS is issued only from the positive output terminal Q of Multivibrator 61 with the result that the switch 66 turns on only during this period. Then, the on-state of the switch 66 is read by the key scan of the apparatus 10 that is being carried out at this time, and thus the forward feed processing is initiated in Video Signal Reproducing Apparatus 10. This causes the burst gate signal BG to stop, which has been issued on so far. This condition is shown in FIG. 8(A).

In the case of PA6=0, PA7=1, a positive pulse of about 50 mS is generated from the positive output terminal Q of Multivibrator 62 and the switch 67 is caused to turn on only for this period. Therefore, Video Signal Reproducing Apparatus starts the backward feed processing. See FIG. 8 (B).

When PA6=PA7=1, positive pulses are generated respectively from the positive output terminals Q of the two multivibrators 61, 62. On the other hand, negative pulses (low level) are issued from the reverse output terminals $\overline{Q}$ of the two multivibrators 61, 62. Since the two terminals $\overline{Q}$ ar connected to the input side of AND Circuit 63, the output of AND Circuit 63 goes to the high level to turn on the transistor 64. As a result of this, the terminal A1 is forced to go into the low level.

Control Unit 30 in Video Signal Reproducing Apparatus 10 is constructed such that the low level state of the terminal A1 has the highest priority among all states of the terminals A1, A2. Therefore, when the terminal A1 goes to the low level, then Control Unit 30 recognizes it as the input of the reset signal, and thus initiates the reset processing, that is, the initial tracking processing (See FIG. 8 (C)).

When a positive pulse that is output from AND Circuit 74 is input to the clock input terminal CK of DT Flipflop 83, since the D input thereof is always in the high level, then this flipflop 83 is set and the output Q thereof becomes the high level. This high level output Q is transmitted via OR Circuit 84 to Computer 1 and Interface 50 as a busy signal BUSY (See FIG. 8).

In the above-mentioned manner, in accordance with the forward feed, backward feed or reset commands, the corresponding operation is initiated and at the same time the busy signal BUSY rises to inhibit Computer 1 from accessing.

Since the busy signals BUSY of all interfaces 50 are connected to one another by means of OR Circuit 84, when any of the apparatus is in the busy state, then Computer 1 cannot access any apparatus.

When it is desired to prohibit the generation of the busy signal(s) with respect to any given one or all of the apparatus, a jumper 85 between the input terminal D of the flipflop 83 and a high-level power source may be cut off. In this case, since not only the transmission of the busy signal is prohibited but also the ready signal $\overline{READY}$ signal is not generated, after it issues its command(s) to any given one or all of the apparatus, Computer 1 must wait a sufficient time during which the relevent apparatus can complete necessary processings (e.g., forward feed processing).

The busy state can be removed by forcibly resetting the flip-flop 83 (terminal R) by means of the output of AND Circuit 82. This removal, in principle, is performed by detecting by a differentiation circuit 81 the rising of the burst gate signal BG input through the terminal A3 of the connector 39B. The detection signal of the burst gate signal BG is output from Differentiation Circuit 81 in the form of a low-level pulse and is then input to AND Circuit 82. When the other remaining three inputs of AND Circuit 82 are all in the low level, then a high level pulse is output from AND Circuit 82. Thus, Flipflop 83 is then forcibly reset and its positive output Q falls down to the low level (See FIG. 8). In other words, when the forward feed processing, backward feed processing or initial tracking processing is completed, then, as described above, the burst gate signal BG is generated, so that the busy signal BUSY goes to the low level and the ready signal $\overline{READY}$ goes to the high level. From this time, it is possible for Computer 1 to access the apparatus 10.

The conditions provided by the other three inputs of AND Circuit 82 are as follows: that is, the flipflop 83 is once set and its reverse output $\overline{Q}$ is in the low level, which means that a busy signal has already been generated; and, the positive outputs Q of the one-shot multivibrators 61 and 62 have already fallen down to the low level, which means that the set time of the multivibrators 61 and 62, namely, the above-mentioned 50 mS has already been passed.

Finally, description will be given of image mute. The video signal output terminal 48A and input terminal 49A (FIG. 2) are connected to the video signal input terminal 48B and output terminal 49B, respectively. A change-over switch 92 is interposed between these input and output terminals. When the change-over switch 92 is connected to the a side, then the input terminal 48B is connected directly to the output terminal 49B. Therefore, the video signal output from Video Signal Reproducing Apparatus 10 is, as it is, transmitted to Display Device 40.

When the change-over switch 92 is connected to the b side, then the output terminal 49B is grounded. This means that the input terminal 49A of Display Device 40 (FIG. 2) is grounded and thus the image will not appear on CRT 41. This is called image muting.

The line of the sixth bit PA5 is connected to the data input terminal D of DT Flipflop 91. Thus, in the case of PA5=1, if a specification pulse is input to the clock input terminal CK thereof, then Flipflop 91 is set, with the result that the change-over switch 92 is connected to the b side by the output of the thus set flipflop 91, providing an image muting state.

In order to remove the image mute state, Flipflop 91 may be reset. For this purpose, it is necessary that the relevent apparatus is specified by the lower 4 bits PA0~PA3 or the fifth bit PA4 and a control code including the sixth bit in the form of PA5=0 is given.

Processings by Computer

Computer 1 is capable of performing various kinds of control operations. It is preferred that the positions of the magnetic heads of all the video signal reproducing apparatus 10, that is, the current position track Nos. are stored in the memory of Computer 1.

In the initial processing, Computer 1 sends reset commands to all of the apparatus 10 and makes all the apparatus 10 to carry out their respective initial tracking processings. Also, Computer 1 sets the current position track Nos. of all the apparatus 10 to 1. In the processings covering all of the apparatus 10, since all apparatus can be specified by the fifth bit PA4, Computer 1 is able to control all apparatus by means of a single processing.

When a predetermined track No. is to be set for a given apparatus 10, a forward feed command or a backward feed command may be given repetitively with respect to the apparatus 10. For example, when accessing a certain apparatus 10, which has a current position track No. of 10, up to the track No. 15, the forward feed command may be issued 5 times repeatedly. That is, when the first forward feed command is issued, then the given apparatus 10 goes to the busy state. Thus, after the busy state thereof is removed, the second forward feed command is sent out. If this processing is repeated 5 times, then, in the apparatus 10, 5 forward feed operations have been performed consecutively, with the result that the magnetic head 12 of the apparatus 10 is positioned in Track No. 15.

Construction in the case of Multi-Screen

Figure 9:
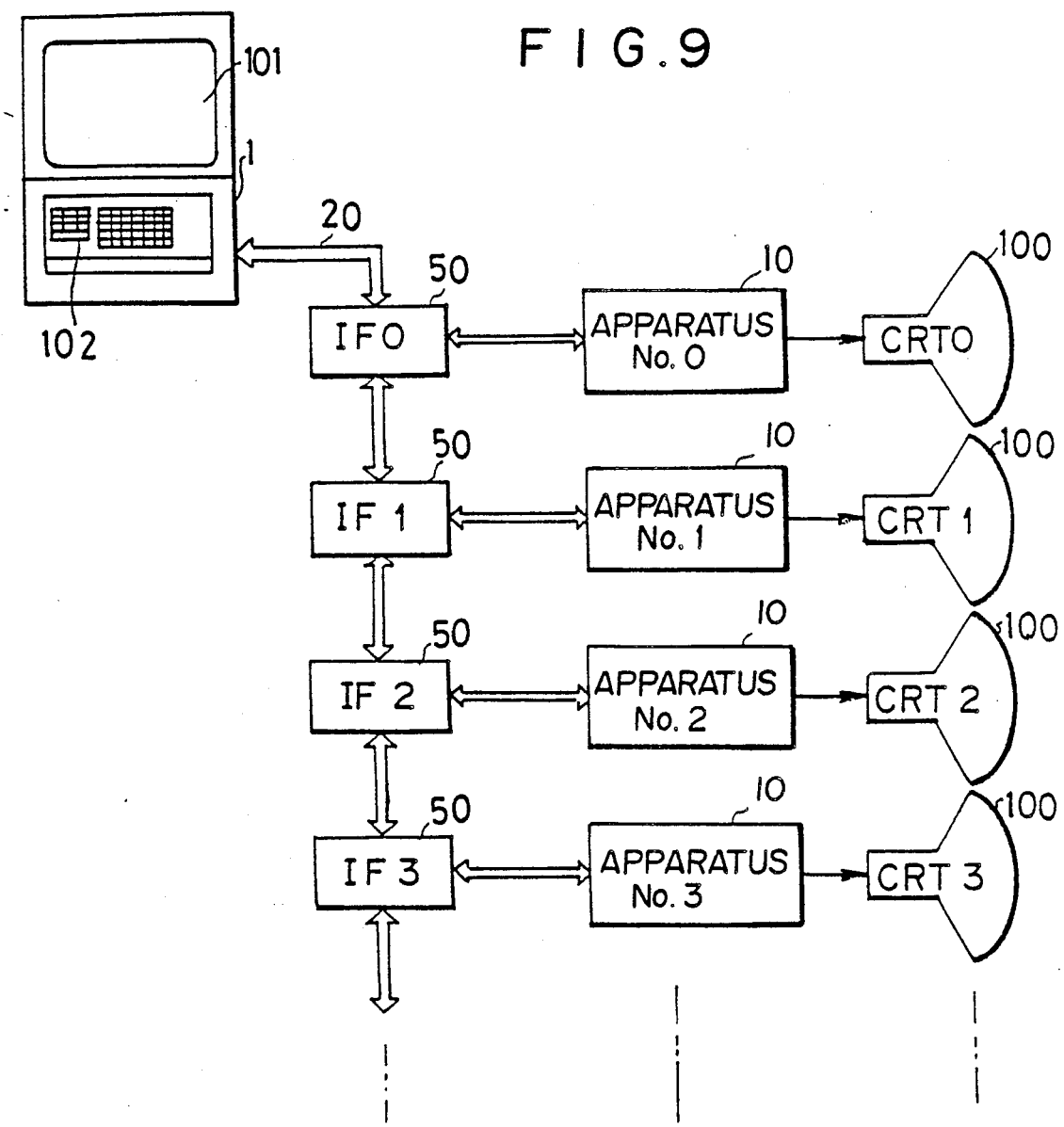
FIG. 9 is a block diagram to show a general outline of another embodiment of an image display system to which a video signal reproducing apparatus is applied in accordance with the invention.

In FIG. 9, there is shown a construction of a whole image display system which is another application of a video signal reproducing apparatus. The same parts thereof as in FIG. 1 are given the same designations and the detailed description thereof is omitted here. In FIG. 9, Video Signal Reproducing Apparatus 10 (No. 0, No. 1, No. 2,—No. 15) are connected to CRTs 100 (CRT 0, CRT 1,—CRT 15), respectively, in a 1-to-1 corresponding manner. The display screens of these 16 CRTs 100 (CRT 0~CRT 15), as shown in FIG. 10, are arranged two-dimensionally so as to form a large screen (that is, a multiscreen) 160. In FIG. 10, the display screens of CRT 0~CRT 3, CRT 4~CRT 7, CRT 8~CRT 11 and CRT 12~CRT 15 are designated by A0~A3, B0~B3, C0~C3 and D0~D3, respectively.

Also, although not shown, a cassette interface is connected to Bus Line 20. For example, sounds (including music, narration and the like) can be recorded into a cassette tape according to images reproduced on the multi-screen 160 by Video Signal Reproducing Apparatus 10 (No. 0~No. 15), and the cassette tape can be reproduced.

Figure 12:
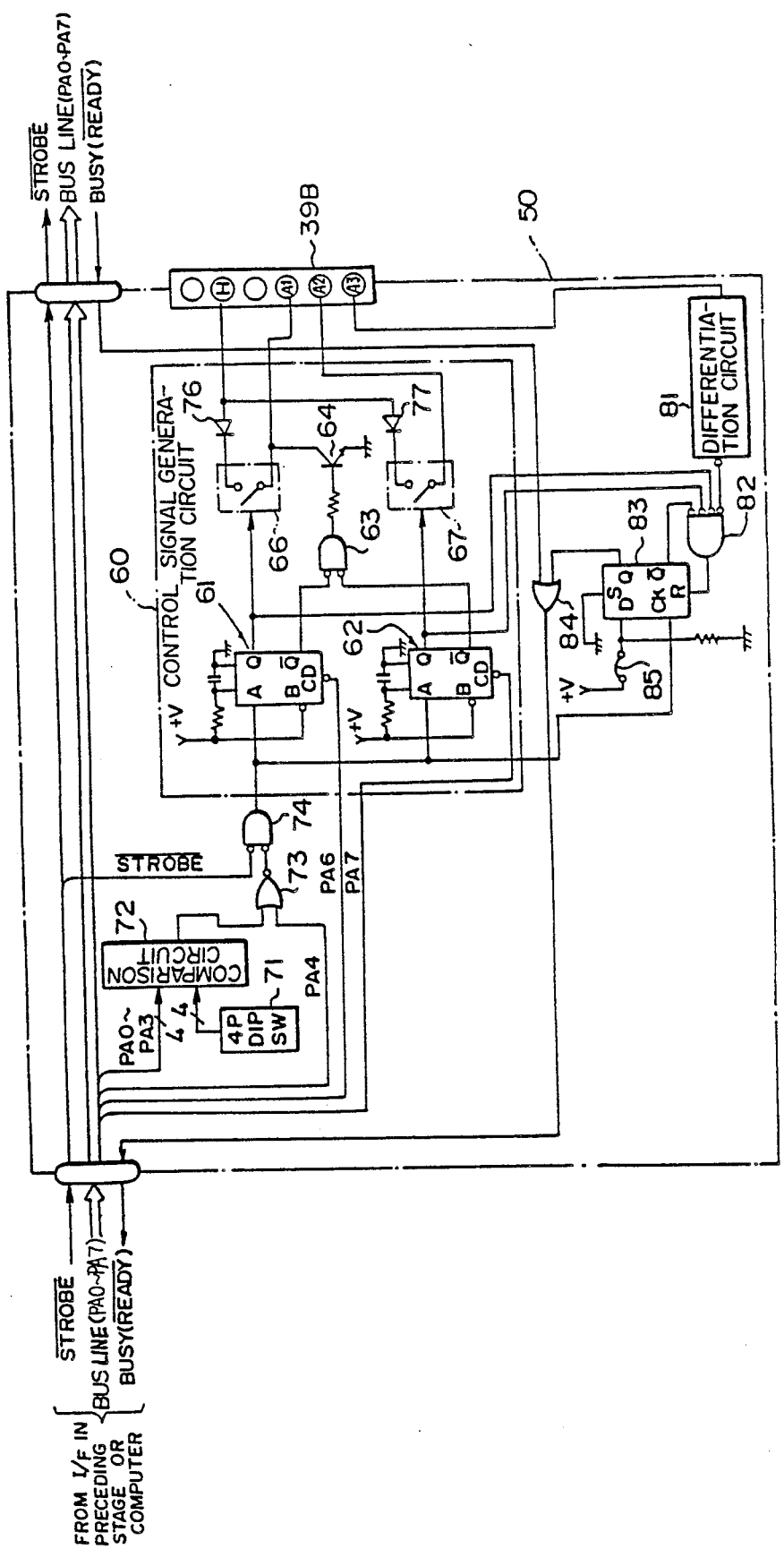
FIG. 12 is a block diagram to show the construction of the interface shown in FIG. 9.

Here, the interface 50 is substantially identical in structure with the interface employed in the image display system shown in FIG. 1 (the concrete structure thereof is shown in FIG. 7). However, unlike the image display system shown in FIG. 1, the present system eliminates the need for provision of DT Flip-flop 91, a change-over switch 92 and terminals 48B, 49B necessary to perform the "Image Mute" operation as shown in FIG. 7, since in the present system the CRTs as the display devices are not directly connected to the respective interfaces. Except for this, the interface employed in the present system is completely the same with the interface shown in FIG. 7 in structure and the present interface is shown in FIG. 12.

On the front surface of the box-structure of Computer 1 there is provided an operation panel 102 and the operation panel 102 is provided with a ten-key pad for input operation, and various kinds of function keys. Also, on the screen of CRT 101 directly connected to Computer 1 there can be displayed information necessary for an operator to operate the multi-screen display device.

In the above-mentioned construction, when a key input operation in the operation panel 102 points out to the effect that a given piece of image information is reproduced by means of a given pattern (for example, expansion, contraction or the like), then a given piece of instruction data is sent out from Computer 1 onto Bus Line 20.

As a result of this, given tracks on the magnetic disks respectively incorporated in the associated video signal reproducing apparatus 10 (No. 0~No. 15) are accessed through the interfaces 50 (IF 0~IF 15), and thus video signals respectively representing partial images are output from the respective video signal reproducing apparatus 10 (No. 0~No. 15) to the respective CRTs 100 (CRT 0~CRT 15) so that sub-images (that is, partial images), each representing a part of a large image, can be displayed on the respective display screens of CRTs 100 (CRT 0~CRT 15), as shown in FIG. 10.

In this way, for example, an image representing a landscape or the like can be displayed on the multi-screen 160.

Also, by specifying a reproduction mode by means of the key input operation, video signals, respectively representing images expanded or contracted by the respective video signal reproducing apparatus 10 (No. 0~No. 15) and recorded into the given tracks on the respective magnetic disks, can be reproduced from the above-mentioned given tracks (the tracks of the same No. are accessed via the respective interfaces 50 (IF 0~IF 15) so that the expanded or contracted images can be displayed on the multi-screen 160.

Figure 11:
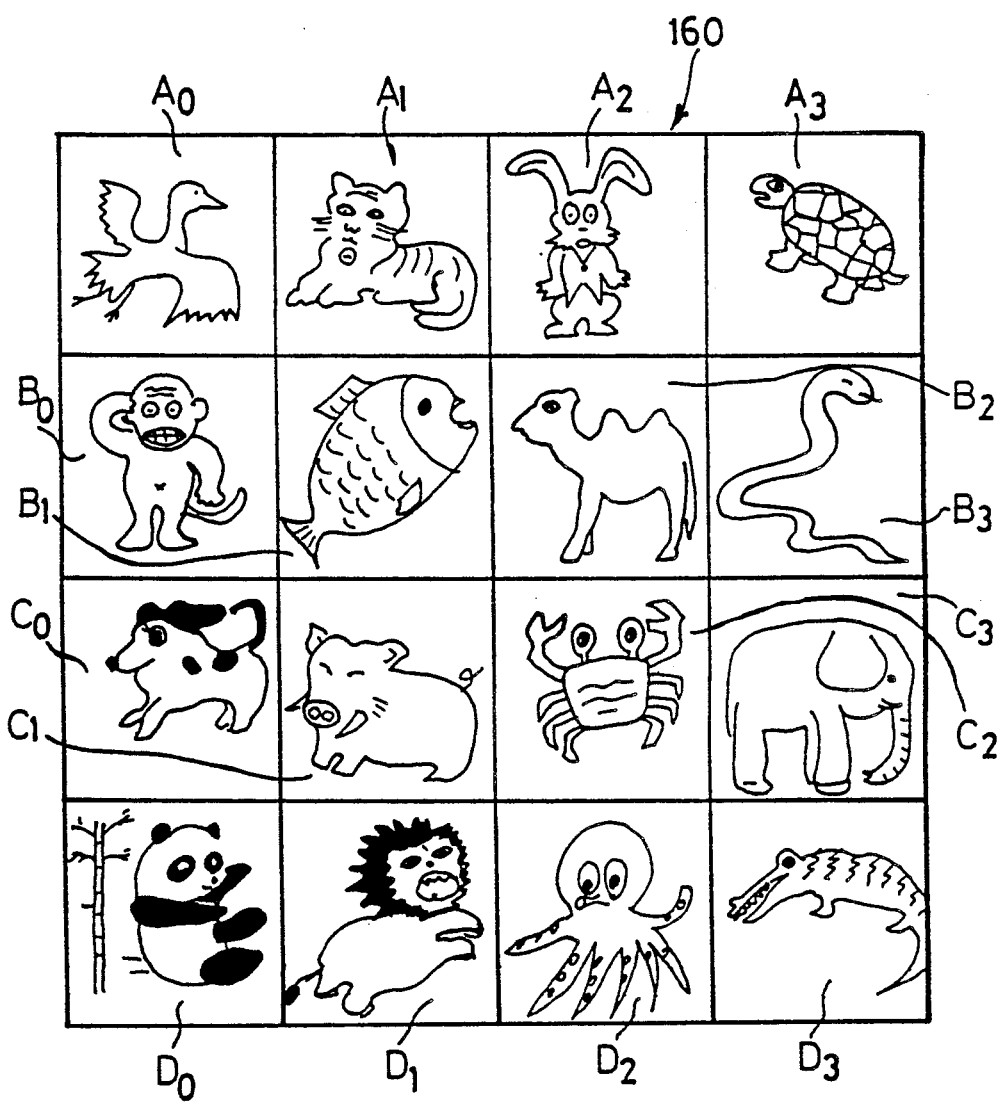
FIG. 11 is a view to show another embodiment of a multiple screen provided by an image display system in accordance with the invention.

Of course, as shown in FIG. 11, individual images can also be displayed on the respective CRT 0~CRT 15.

Further, by changing in a time series manner the accessing order of the respective interfaces 50(IF 0~IF 15), that is, the respective video signal reproducing apparatus 10 (No. 0~No. 15) when the image to be displayed on the multiscreen 160 is to be altered, it is possible to vary in a special manner a state in which an image which has been displayed on the multi-screen 160 is switched over to an image to be displayed next. In other words, it is possible to change the current image to the next image, for example, from the central portion of the multi-screen 160 to the peripheral direction thereof, or, in FIG. 10, in the order of the display screens A0→A1→—A3→B1→B2→—. of course, if all of the video signal reproducing apparatus 10 are accessed simultaneously through the interfaces 50(IF0-~IF15), then the image currently displayed on the multi-screen 160 can be altered to the next image in a moment.

Construction of another embodiment of a whole system

Figure 13:
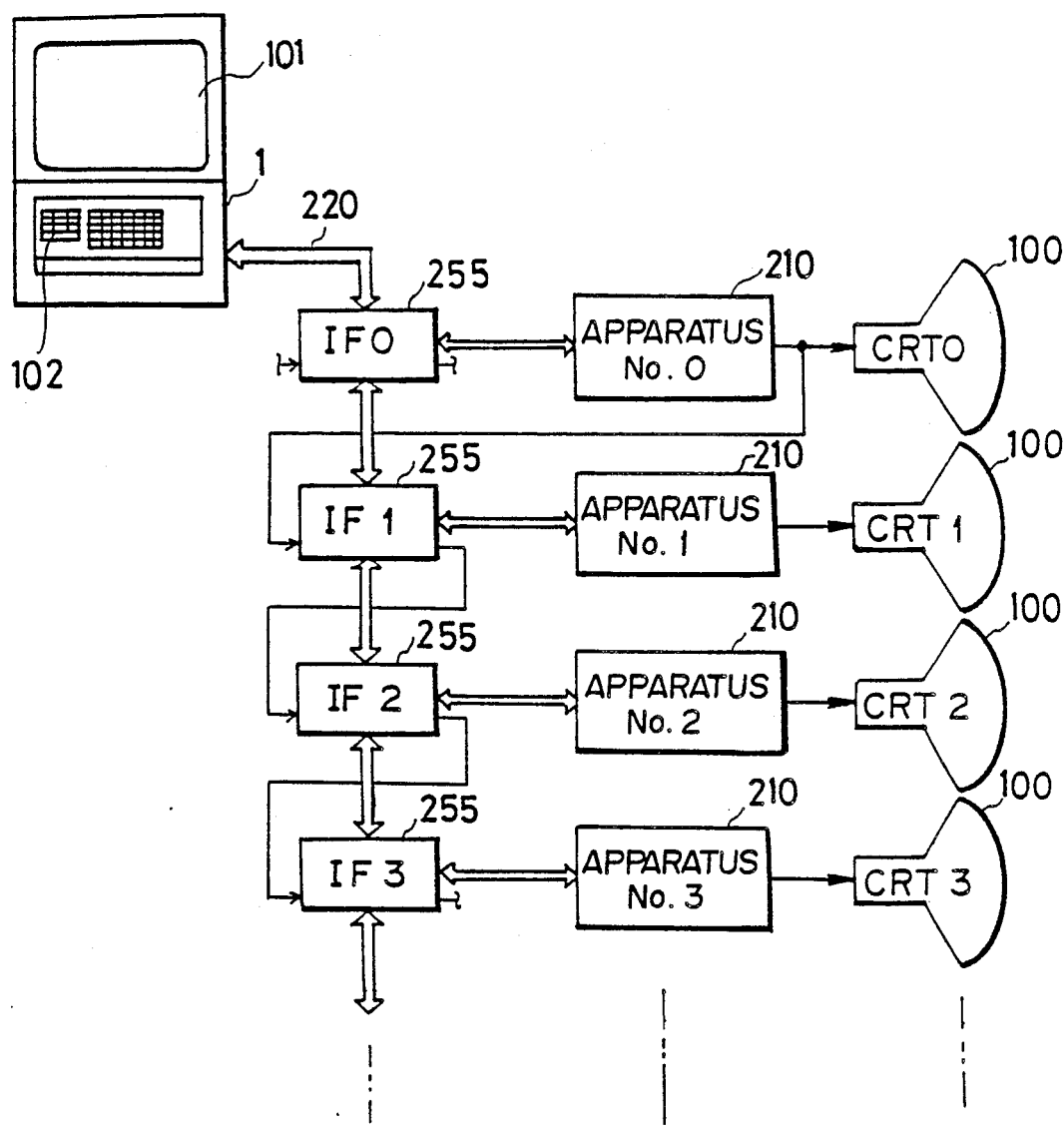
FIG. 13 is a view to show another embodiment of the image display system shown in FIG. 9.

Referring now to FIG. 13, there is shown a general construction of another embodiment according of an image display system to the invention.

In FIG. 13, reference numeral 210 designates a general term for video signal reproducing apparatus which serves as the terminal devices of the image display system according to the invention. In this embodiment, there are employed 16 pieces of such video signal reproducing apparatus. These video signal reproducing apparatus 210 are respectively given Nos. (No. 0, No. 1, No. 2, No. 3, —), and, as in the above-mentioned first embodiment, they are connected by a bus line 220 to a small-size computer 1 through their associated interfaces 255 (IF 0, IF 1, IF 2, IF 3, —) provided respectively so as to correspond to the above-mentioned video signal reproducing apparatus 210 in a one-to-one manner.

As will be described later in detail, between the computer 1 and the respective video signal reproducing apparatus 210 (No. 0, No. 1, No. 2, No. 3, —) various kinds of control signals (BUSY, STOP, synchronous signals and the like) as well as various kinds of data can be transmitted and received through the respective corresponding interfaces 255 (IF 0, IF1, IF 2, IF 3, —), and thus image information can be output onto the screens of CRTs 100 (CRT 0~CRT 15) which are respectively connected to the apparatus 210 such that each CRT 100 corresponds to each apparatus 210. As a result of this, as in the first embodiment, a multi-screen can be provided, that is, the image information can be displayed on the multi-screen.

In the above-mentioned construction, if a desired image information is specified by an operator's key input operation, then a given piece of instruction data is sent out from the computer 1 onto the bus line 220. As a result of this, a video signal reproducing apparatus in a magnetic recording/reproducing system or the like for reproduction of the desired image information, for example, the video signal reproducing apparatus 210 of No. 0 is accessed through the interface 255 (IF 0) which is provided so as to correspond to the video signal reproducing apparatus 210 of No. 0, and a given track on a magnetic disk, where a video signal to be reproduced by the relevent apparatus 210 has been recorded, is accessed. Thus, the video signal reproduced by the video signal reproducing apparatus 210 (of No. 0) is output to the CRT 100 (CRT 0), so that the desired image information can be displayed on the screen of the CRT 100 (CRT 0).

Then, if another desired image information to be reproduced by the video signal reproducing apparatus 210 of No. 1 is specified likewise by an operator's key operation, then the video signal reproducing apparatus 210 of No. 1 is accessed through an interface 255 (IF 1) provided so as to correspond to the video signal reproducing apparatus 210 of No. 1, and at the same time a given track on a magnetic disk within the video signal reproducing apparatus 210 of No. 1 is accessed. Following this, the video signal that is reproduced by the video signal reproducing apparatus 210 (of No. 1) is output onto a CRT 100 (CRT 1), so that the desired image information can be displayed on the screen of the CRT 100 (CRT 1).

Similarly, other following pieces of image information specified by the key operations can be displayed on the respective screens of the CRTs 100 by the respective video signal reproducing apparatus 210 in charge of the respective pieces of image information.

It should be noted here that, in this embodiment, the whole image display system is to be operated synchronously by means of a synchronizing signal which is created based on a vertical synchronizing signal of a video signal output from the video signal reproducing apparatus 210 of No. 0 and also which has a frequency substantially equal to that of this vertical synchronizing signal.

Figure 14:
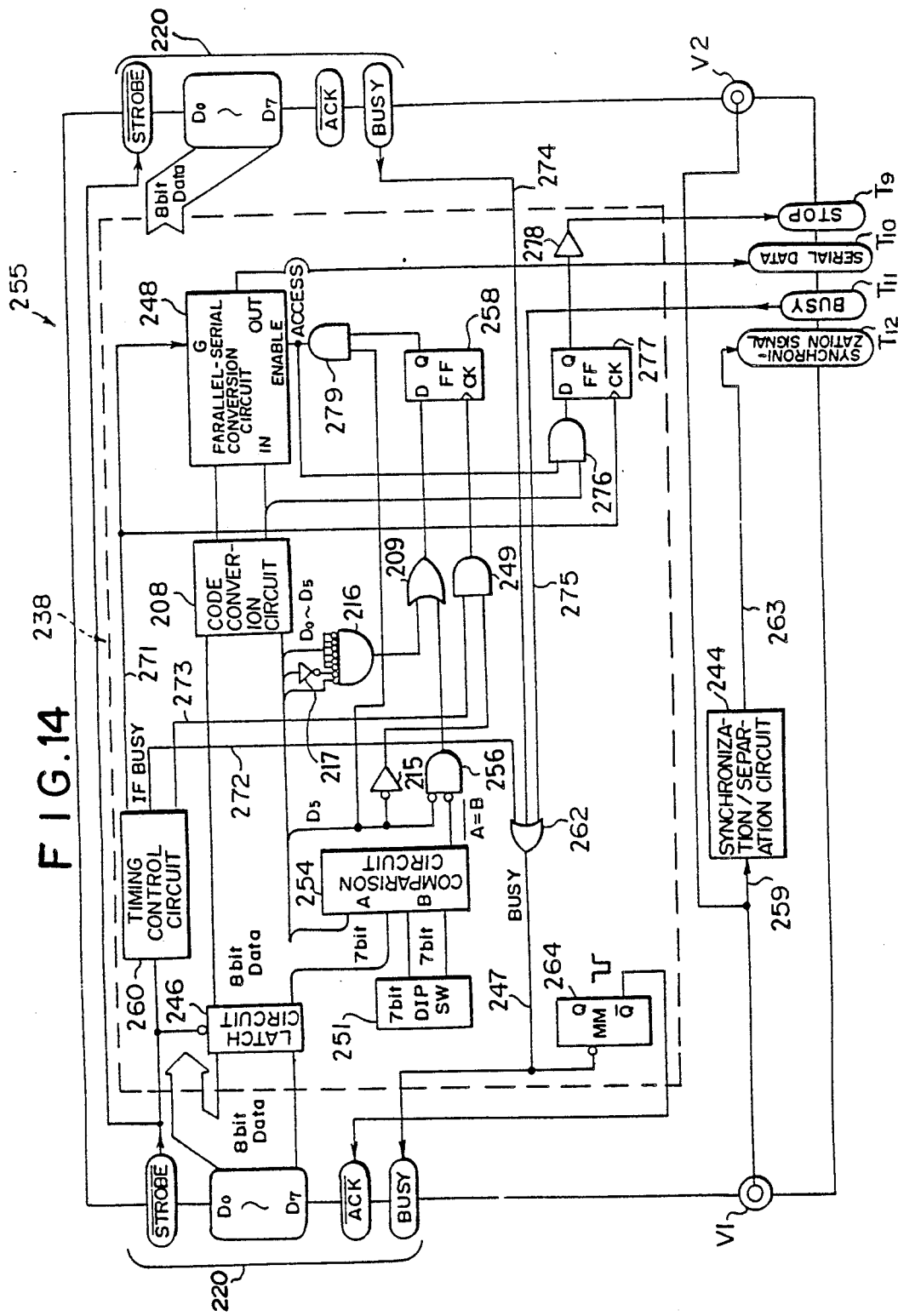
FIG. 14 is a block diagram to show the circuit configuration of an interface employed in the embodiment in FIG. 13.

Next, with respect to FIG. 14, we will describe the circuit configuration of the interface 255 shown in FIG. 12.

In FIG. 14, the interface 255 (IF 0) is connected to the computer 1 or to the following interfaces 255 (IF 1, IF 2, IF 3) via a bus line 220 which comprises data buses ($D_0 \sim D_7$) and control buses (STROBE, e,ovs-ACK, BUSY). Also, Interface 255 is provided with a video signal input terminal V1 for input of the video signal, a video signal output terminal V2 for bypassing and outputting the video signal to the following circuit, a stop signal output terminal $T_9$ to be connected with the video signal reproducing apparatus 210, a serial data output terminal $T_{10}$, a busy signal input terminal $T_{11}$, and a synchronizing signal output terminal $T_{12}$.

Further, Interface 255 includes a data control circuit 238 for transmitting and receiving a control signal to control the operation of the video signal reproducing apparatus 210, and a synchronization/isolation circuit 244 for outputting a synchronizing signal 263 necessary for synchronously operating the video signal reproducing apparatus 210 in accordance with the vertical synchronizing signal of a video signal 259 which is input from an external source via the video signal input terminal V1.

On the other hand, Computer 1 outputs to Data Buses (Do $D_7$) in units of 8 bits device specifying data ($D_0 \sim D_4, D_6, D_7$) for accessing a given one or all of the interfaces 255 and identification data ($D_5$) for determining whether the data output on Data Buses are the above-mentioned device specifying data or command specifying data ($D_0 \sim D_4, D_6, D_7$) to specify commands for indicating the control associated with the reproducing operation of the above-mentioned plurality of video signal reproducing apparatus 210; or the above-mentioned command specifying data and identification data.

Construction and Operation of Interface

Referring to the data control circuit 238 shown in FIG. 14 reference numeral 246 designates a latch circuit for latching parallel data of 8 bits output on Data Buses ($D_0 \sim D_7$) of Bus Line 220 when it receives a strobe signal $\overline{STROBE}$ output from Computer 1, 208 a code conversion circuit which receives parallel data of 5 bits comprising the lower 4 bits and upper 1 bit of the latch data of Latch Circuit 246 and outputs parallel data coded in a given number of bits, and 248 a parallel/serial conversion circuit for converting the coded parallel data output from Code Conversion Circuit 208 into serial data.

Also, 251 designates a 7-bit type dip switch for setting up to 127 the device Nos., that is, device codes (IF 0, IF 1, ——) of the respective interfaces 255 that are provied so as to correspond in a 1-to-1 manner to the respective video signal reproducing apparatus 210 having their own individual apparatus Nos.; 254 a comparison circuit which compares the 7 bits of parallel data except the identification data output on the data bus $D_5$ out of the 8 bits of parallel data latched by Latch Circuit 246 with the 7 bits of data representing the device codes set by the dip switch 251 and given to the respective interfaces 255, 256 an AND circuit which is operated when it receives the data representing the comparison results output rom Comparison Circuit 254 and the identification data on the data bus $D_5$; 217 an inverter for reversing the level of a bit signal on the data bus $D_6$; 216 an AND circuit with 8 inputs which receives as its input signals bit signals on the data buses $D_0 \sim D_5$, $D_7$ and an output signal from Inverter 217; and, 209 an OR circuit which is put into operation when it receives signals output from AND Circuit 256 and AND Circuit 216.

Further, 260 designates a timing control circuit which receives the strobe signal $\overline{STROBE}$ and outputs various timing signals (a serial conversion signal 271, an interface operation signal 272, an access permission signal 273); 215 an inverter for reversing the level of a bit signal which is the identification data output on the data bus $D_5$; 249 an AND Circuit which is put into operation when it receives the access permission signal output from Timing Control Circuit 260 and a signal output from Inverter 215; 258 a D-flipflop circuit which is put into operation when it receives a signal output from OR Circuit 209 at the input terminal D thereof and a signal output from AND Circuit 249 at the input terminal CK; and, 276 an AND Circuit for outputting an access signal ACCESS to the control terminal ENABLE of Parallel/Serial Conversion Circuit 248 in accordance with a bit signal which is the identification signal output on the data bus $D_5$ as well as a signal output from the output terminal Q of D-Flipflop Circuit 258.

In addition, 262 designates an OR circuit with 3 inputs which outputs a busy signal BUSY 247 on the control bus in accordance with the interface operation signal 272 output from Timing Control Circuit 260, the busy signal BUSY 274 representing the fact that other interfaces 255 and video signal reproducing apparatus 210 are in operation for reproduction, and a busy signal BUSY 275 representing that the video signal reproducing apparatus 210 to be connected to the relevent interface 255 is in operation for reproduction; and, 264 a re-trigger type monostable multivibrator (MM) for outputting an acknowledge signal $\overline{ACK}$ indicating that the data transmission and reception between Computer 1, Interface 255 and Video Signal Reproducing Apparatus 210 has been completed, in accordance with the busy signal BUSY 247 output from OR Circuit 262.

Moreover, 276 designates an AND circuit which receives as its input signals given seven bits of data out of the coded parallel data output from Code Conversion Circuit 208 as well as an access signal ACCESS output from AND Circuit 279; 277 a flipflop circuit which receives a signal output from AND Circuit 276 at the input terminal D thereof and a serial conversion signal output from Timing Control Circuit 260 at the clock input terminal CK thereof, and outputs a stop signal STOP for stopping the operation of the video signal reproducing apparatus 210; and, 278 and inverter.

Synchronization/separation Circuit 244 is a circuit to obtain a synchronizing signal 263 having a frequency substantially equal to that of a vertical synchronizing signal included in a video signal 259, in accordance with the video signal 259 input from an external source via the video signal input terminal V1.

Next, description will be given of an outline of the operation of the above constructed interface 255 in connection with a timing chart shown in FIG. 15.

Computer 1 outputs 8 bits of parallel data onto the data buses (Do ~D7). A total of 7 bits of parallel data output on the data buses (Do ~D4, D6 ~D7) except the data bus D5 out of the 8 bits of parallel data are used to indicate device specifying data representing the device code(s) of a given one or all of the interfaces 255 to be accessed, or command specifying data to specify a command for instructing the control associated with the reproducing operation of one or all of a plurality of video signal reproducing apparatus 210. And, whether the data output on the data buses is the device specifying data or the command specifying data can be determined in accordance with the level of the bit signal that is the identification data output on the data bus D5. In this embodiment, when the level of the bit signal on the data bus D5 is in the low level, then the data is considered as the device specifying data, and, when in the high level, then it is considered as the command specifying data.

For example, when a track 13 on a magnetic disk in a given video signal reproducing apparatus 210 is to be accessed via Interface 255 according to the instruction of Computer 1, the access is performed by a signal comprising 4 bytes of data in the following procedures.

Figure 15:
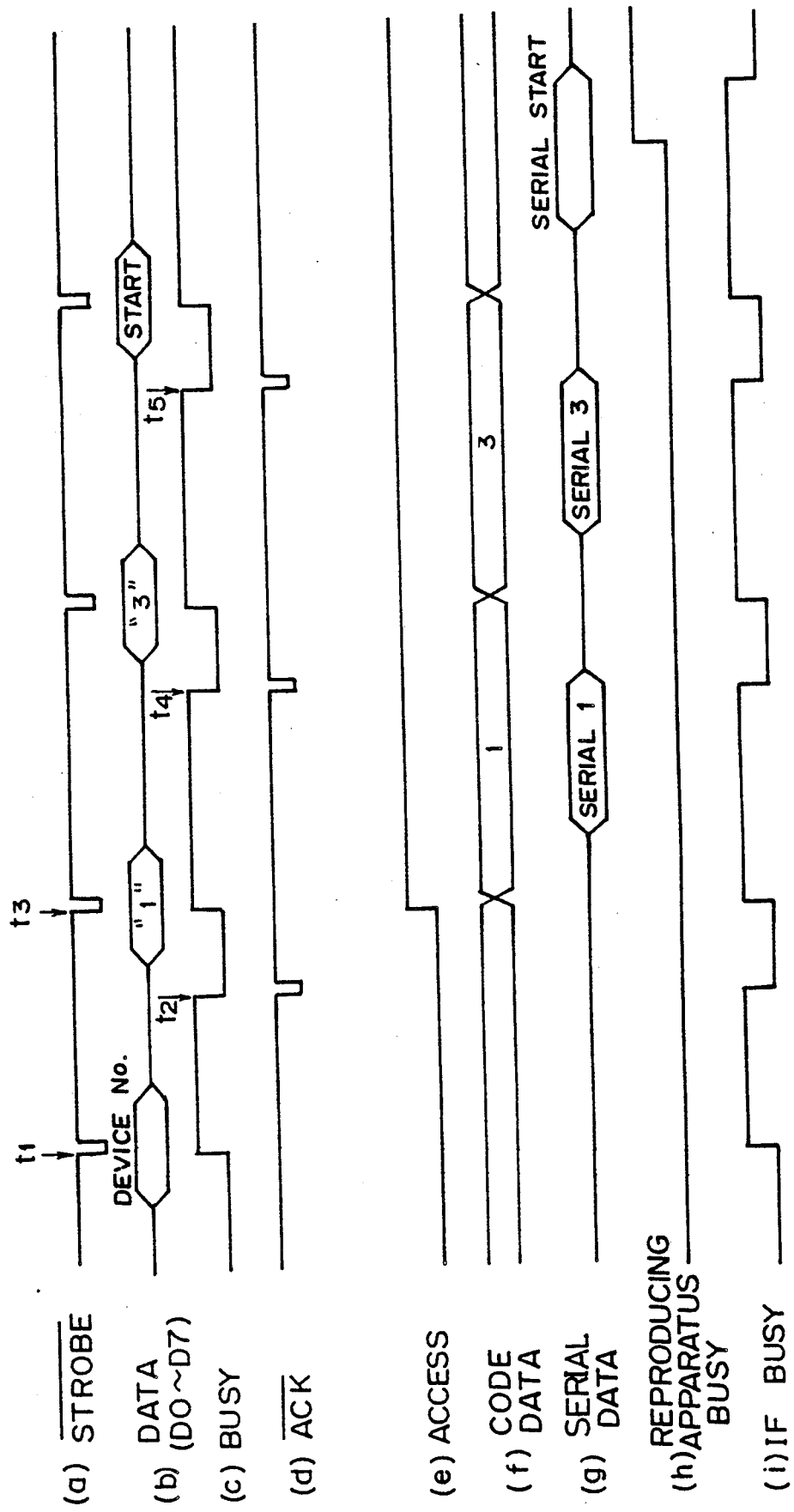
FIG. 15 is a timing chart to explain the operation of the interface shown in FIG. 14.

At first, if a desired piece of image information is specified by the ten-key pad of the operation panel 102 provided in Computer 1, then Computer 1 outputs onto the data buses (Do ~D7) of Bus Line 220 the 8-bit device specifying data representing the device code of the interface 255 corresponding to the video signal reproducing apparatus 210 of the apparatus No. storing the specified image information (for example, the data representing the device code of the interface 255(IF 0) corresponding to the video signal reproducing apparatus 210 of No. 0) (FIG. 15 (b)), and, after then, the strobe signal $\overline{STROBE}$ (FIG. 15 (a)) is output onto the control bus. As a result of this, at the falling time t1 of the strobe signal $\overline{STROBE}$ (FIG. 15 (a)), the signals on the data buses (D$_o$ ~D7) (FIG. 15 (b)) are latched by Latch Circuit 246 of Interface 255. At the same time, a busy signal BUSY (FIG. 15 (c)) obtained in accordance with the interface operation signal 272 (FIG. 15 (i)) output from Timing Control Circuit 260 at the time t1 and indicating that the interface 255 in operation is output from the interface 255 onto the control bus via OR Circuit 262. Due to this, Computer 1 is notified that the interface 255 having the device code of IF O is under access, and, while the busy signal BUSY (FIG. 15 (c)) is being output, new data will not be output onto the data buses (D$_O$ ~D7) from Computer 1.

Further, since the 7-bit device specifying data corresponding to the device codes of the interfaces 255 latched by Latch Circuit 246 coincide with the 7-bit parallel data representing the device codes of the above interfaces 255 to be set by by the dip switch 251, and also since the access permission signal 273 is output from Timing Control Circuit 260, D.Flipflop Circuit 258 outputs, at the time t1, from the output terminal Q to its following AND Circuit 279 a signal for permitting the conversion operation of the parallel/serial conversion circuit 248. However, at the time t1, since the signal level of the identification data output on the data bus D5 to be input to the other input terminal of AND Circuit 279 is the low level indicating that a given one or all of the interfaces are being specified, AND Circuit 249 will not output the access signal ACCESS (FIG. 15(e)). Therefore, even when the parallel data latched by Latch Circuit 246 are input through Code Conversion Circuit 208 to Parallel/Serial Conversion Circuit 248, the parallel data will not be converted into serial data.

Next, at a time t2, a busy signal IF BUSY (FIG. 15 (i)) which has been output from Timing Control Circuit 260 is no longer output, and thus the busy signal BUSY (FIG. 15 (i)) is no longer output onto the control bus as well. Then, Computer 1 recognizes that the busy signal BUSY (FIG. 15 (c)) is in the low level, with the result that Computer 1 outputs the device specifying data and after then outputs the command specifying data after a time t3. That is, at first, at the time t3, the 8 bits of parallel data (FIG. 15 (b)) including information corresponding to a digit "1" out of the track 13 in which a desired piece of image information is recorded are output onto the data buses (D$_0$~D7) and are then latched by Latch Circuit 246. Further, the 8 bits of parallel data (FIG. 15 (b)) latched by Latch Circuit 246 are input to the code conversion circuit 208. Code Conversion Circuit 208 outputs to Parallel/Serial Conversion Circuit 248 parallel data (FIG. 15 (f)) coded in a given number of bits and recognizable by the video signal reproducing apparatus 210 to be connected to the relevent interface 255(IF 0), in accordance with 5 bits of parallel data out of the 8 bits of parallel data. On the other hand, since the signal on the data bus D5 turns from the low level to the high level indicating that the signal on the data bus is the command specifying data, the access signal ACCESS (FIG. 15 (e)) for permitting access to Parallel/-Serial Conversion Circuit 248, that is, for permitting the conversion operation of Parallel/Serial Conversion Circuit 248 is output from AND Circuit 279 to the control terminal ENABLE of Parallel/Serial Conversion Circuit 248. As a result of this, if a serial conversion signal 71 to be output from Timing Control Circuit 260 is input to the active terminal G thereof, then Parallel/-Serial Conversion Circuit 248 converts the coded parallel data into the serial data (FIG. 15 (g)). Then, the converted serial data (FIG. 15 (g)) recognizable by the corresponding video signal reproducing apparatus 210 are output via the serial data output terminal T$_{10}$ to the video signal reproducing apparatus 210 to be connected to the relevent interface 255. Next, at a time t4, the busy signal IF BUSY (FIG. 15 (i)) that has been output from Timing Control Circuit 260 is no longer output, and thus the busy signal BUSY (FIG. 15 (c)) is no longer output to Computer 1, similarly as described above. As a result of this, the 8 bits of parallel data (FIG. 15 (b)) including information corresponding to a digit "3" are output from Computer 1 to the data buses (D$_0$~D7). Then, the 8 bits of parallel data are input via Latch Circuit 246 to Code Conversion Circuit 208, with the result that, in accordance with 5 bits of parallel data out of the 8 bits of parallel data, Code Conversion Circuit 208 outputs to Parallel/Serial Conversion Circuit 248 the parallel data (FIG. 15 (f)) coded in a given number of bits. Parallel/Serial Conversion Circuit 248 converts the thus input and coded parallel data into the serial data (FIG. 15 (g)) after it receives at the active terminal G thereof a serial conversion signal 271 to be output from Timing Control Circuit 260. The converted serial data (FIG. 15 (g)) are output via the serial data output terminal T$_{10}$ of Parallel/Serial Conversion Circuit 248 to the video signal reproducing apparatus 210. Also, since the busy signal BUSY (FIG. 15 (c)) is being output on the control bus while the serial data (FIG. 15 (g)) are being output from Parallel/Serial Conversion Circuit 248 to the video signal reproducing apparatus 210, Computer 1 does not output the next data onto the data buses ($D_0 \sim D_7$) and waits until the busy signal BUSY (FIG. 15 (c)) is no longer output. Next, at a time $t_5$, if the busy signal IF BUSY (FIG. 15 (i)) that has been output from Timing Control Circuit 260 is no longer output, then Computer 1 outputs onto the data buses ($D_0 \sim D_7$) the command specifying data (FIG. 15 (b)) to instruct a drive command (start) for reproducing the image or video signals on the track 13. As a result of this, the command specifying data output on the data buses ($D_0 \sim D_7$), that is, the 8 bits of parallel data are input through Latch Circuit 246 into Code Conversion Circuit 208. Then, in accordance with 5 bits of parallel data out of the input 8 bits of parallel data, Code Conversion Circuit 208 outputs to Parallel/Serial Conversion Circuit 248 the parallel data (FIG. 15 (f)) that have been coded in a given number of bits. Parallel/Serial Conversion Circuit 248, as in the above-mentioned case, converts the thus input and coded parallel data into the serial data and outputs them to the video signal reproducing apparatus 210.

Also, while the video signal reproducing apparatus 210 is reproducing the video signals on the specified track in accordance with the above-mentioned drive command (start), a busy signal BUSY (FIG. 15 (h)) indicating that the selected video signal reproducing apparatus 210 is in operation is output from the same video signal reproducing apparatus 210 via Interface 255 to Computer 1.

Further, in the accessing interface 255, when the key input operation of the operation panel 102 has not been performed by Computer 1 for a predetermined time or more, command data comprising of 2 bytes for causing the video signal reproducing apparatus 210 to shift its magnetic reproduction head from the track from which the video signals are being detected to another track in which the video signals are not recorded as well as for stopping the operation of the disk motor that is rotationally operating the magnetic reproduction head are automatically output on the data buses. In this embodiment, as in the above-mentioned method for specifying the track No. 13 on the magnetic disk, the command data of 2 bytes are output byte by byte onto the data buses ($D_0 \sim D_7$) and each time the byte is output the output data are input through Latch Circuit 246 to Code Conversion Circuit 208. In accordance with 5 bits of parallel data out of the thus input 8 bits of parallel data, Code Conversion Circuit 208 outputs parallel data which have been coded in a given number of bits and also in which a bit of a given No. is always in the high level. Further, the coded parallel data are converted into serial data by Parallel/Serial Conversion Circuit 248, and the serial data are output to the video signal reproducing apparatus 210 as the command data for shifting the magnetic reproduction head to the track in which the video signals are not recorded.

On the other hand, 2 bytes of command data (stop) are output from Computer 1 via the interface 255 to the video signal reproducing apparatus 210, and at the same time, in accordance with the command data (stop), a stop signal STOP for stopping the operation of the disk motor is output from the interface 255 via the STOP output terminal $T_9$ thereof. In other words, while the interface 255 is accessing, an access signal ACCESS output from AND Circuit 279 is input to AND Circuit 276, and to the other input terminal of AND Circuit 276 are input the data output from Code Conversion Circuit 208 in which a bit of a given No. is in the high level. As a result of this, since AND conditions are satisfied, a signal of the high level is output from AND Circuit 276 to the input terminal D of the following flipflop circuit (FF) 277. Then, if a serial conversion signal 271 from Timing Control Circuit 260 is input to the clock input terminal CK of the flipflop circuit 277, then a stop signal STOP is output from the output terminal Q of the flipflop circuit 277 via the following inverter 278 to the video signal reproducing apparatus 210.

On the other hand, when the data output from Computer 1 onto the data buses are not the stop command, since the bit of a given No. output from Code Conversion Circuit 208 turns from the high level to the low level, a signal of the low level is input to the input terminal D of the flipflop circuit 277. As a result of this, even when the serial conversion signal 271 is input from the timing control circuit 260 to the clock input CK of the flipflop circuit 277, the stop signal STOP will not be output.

Next, the reset operation of the interface 255 will be explained. First, if Computer 1 is operated to output onto the data buses ($D_0 \sim D_7$) the device specifying data indicating the device code of the interface 255 corresponding to other video signal reproducing apparatus 210 of different apparatus No. than the video signal reproducing apparatus 210 of apparatus No. 0 that has been accessed so far, then the device specifying data of the interface 255 being accessed cease to coincide with the parallel data indicating the device code of the relevent interface 255 (IF 0) set up by the dip switch 251, so that the comparison circuit 254 of the currently operating interface 255 outputs a signal of the high level to one input terminal of the following AND circuit 256. Also, to the other input terminal of this AND circuit 256 is input the identification data of the low level on the data bus $D_5$ indicating that the data output on the data buses ($D_0 \sim D_7$) are the device specifying data, with the result that the AND circuit 256 outputs a signal of the low level to one input terminal of an OR Circuit 209 in the next stage. Then, since a signal of the low level is output from the AND circuit 216 to the other input terminal of the OR circuit 209, a signal of the low level is output from the OR circuit 209 to the input terminal D of the D- flipflop circuit 258. Due to this, the D-flipflop circuit 258 receives at the clock input terminal CK thereof the access permission signal 273 from the timing control circuit 260 and thus the signal level of the output terminal Q of the D-flipflop circuit 258 turns from the high level to the low level. As a result of this, the parallel/serial conversion circuit 248 that has been operation is reset to stop its operation. That is, the interface 255 (IF0) is caused to stop its operation (reset).

Also, regardless of the above operation, if data of $40_{16}$ (01000000) is output from Computer 1 onto the data buses, then all of the interfaces 255 that are connected to the bus line 220 are to be accessed, whether the parallel data indicating the device code of the interface 255 set up by the dip switch 251 coincide or not with the device specifying data of the interface 255 output on the data buses. In other words, at first, when the data of $40_{16}$ is output onto the data buses ($D_0 \sim D_7$), then the output signal thereof is input via the OR circuit 209 to the input terminal D of the D-flipflop circuit 258, since AND conditions for the AND circuit 216 are satisfied. Then, the identification data of the low level indicating that the access permission signal 273 output from the timing control circuit 260 and the data output on the data buses are the device specifying data are output onto the data bus $D_5$, with the result that a signal of the high level is output from the D-flipflop circuit 258 to an AND circuit 279 in the next stage. Next, when the identification data of the high level on the data bus $D_5$ indicating that the data output on the data buses are the command specifying data is input to the other input terminal of the AND circuit 279, then the access signal ACCESS is output from the AND circuit 279 to the parallel/serial conversion circuit 248. Therefore, if the serial conversion signal 271 is output from the timing control circuit 260 to the parallel/serial conversion circuit 248, then the command specifying data on the data buses are converted to serial data through the code conversion circuit 208 and the serial data are then output to the video signal reproducing apparatus 210. This operation is to be performed similarly in interfaces 255 in the other stages as well.

As described above, according to the present embodiment, as will be explained later, it is possible to realize such an interface that can correspond to a video signal reproducing apparatus 210 having a function as an intelligent terminal. Also, since 7 bits can be used as the device specifying data, up to 127 pieces of interfaces and thus up to 127 peices of video signal reproducing apparatus can be connected to Computer 1.

Although in the present embodiment the description has been given of a system in which a plurality of video signal reproducing apparatus are to be controlled, it is quite natural that the interface according to the invention is not limited to this, but it can be applied also to a system in which a single video signal reproducing apparatus is to be controlled.

Construction and Operation of Video Signal Reproducing Apparatus

Next, description will be given of the construction of a video signal reproducing apparatus 210 according to the invention in connection with FIG. 16 In FIG. 16 the video signal reproducing apparatus 210 includes a first control unit 240. The control unit 240 is adapted to perform processings for reading the states of various switches including a forward feed switch 415 and a backward feed switch 416, tracking control to be explained later, control of reproduction of video signals, alarm processings and the like. It comprises a central processing unit, preferably, a microprocessor (hereinafter referred to as CPU), a memory for storing its programs and necessary data, and an interface providing the connection between the control unit and its peripheral elements, circuits, devices and the like. The control unit 240 is also equipped with a counter CN which counts the positions of a magnetic head, that is, the track Nos. thereof in its ordinary processings such as the movements of the magnetic head, the tracking control and the like except a random access processing. For the counter CN, a given area of the memory may also be used. Further, in the control unit 240, there is provided an alarm display light (not shown) which can be lit in accordance with a display command from the control unit 240 for predetermined conditions.

A magnetic disk 211 is being mounted to the spindle of a disk motor 221 while it is stored within a bucket and also the bucket is closed and locked. A magnetic reproduction head 212 is provided in such a manner that it is in contact with the magnetic record surface of the magnetic disk 211 and also it is free to move in the radial direction of the magnetic disk 211. Also, the magnetic disk 211 includes a core, and adjacent to and in contact with the core, there is provided a phase detector 213 which detects magnetic substances provided in the core and generates one pulse each time the magnetic disk 211 is rotated.

The disk motor 211 is equipped with a frequency generator 222 which generates a signal of frequencies proportional to the number of revolutions of the disk motor, and the output frequency signal is fed back to a servo control circuit 223. A detection pulse output from the phase detector 213 is also input to the servo control circuit 223 and the control unit 240. In FIG. 16, there is illustrated a reference clock pulse generator 224 which generates a reference signal of 60 Hz equal to the field frequencies of a raster scan video signal recorded in the magnetic disk 211 and transmits the reference signal to the servo control circuit 223, while it supplies a clock pulse of high speeds, for example, 3.58 MHz to the control unit 240. In accordance with the input signals, the servo control circuit 223 controls the disk motor 221 so that it is constantly rotated at a given number of rotations, for example, at 3,600 r.p.m.. The servo control circuit 223 also starts and stops the disk motor 221 in accordance with commands from the control unit 240.

The magnetic head 212 is supported movably in the radial direction of the magnetic disk 211 and can be shifted in such direction by a shift/drive apparatus including a stepping motor 214. Although the control of the stepping motor 214 for shifting of the magnetic head 212 will be described later, a drive pulse of 4 phases A, $\overline{A}$, B, $\overline{B}$ is given from a drive circuit 252 to the stepping motor 214. The drive pulse DP is generated from a second control unit 250 and is then applied to a drive circuit 252. The direction of shift of the magnetic head 212 is determined by the direction of rotation of the stepping motor 214, and the distance of shift of the magentic head 212 is proportional to the angle of rotation of the stepping motor 214. For example, the stepping motor 214 rotates about 30 degrees per shift pulse, with the result that the magnetic head 212 is shifted about 8.4 $\mu$m. Therefore, 12 shift pulses can shift the magnetic head 212 nearly 1 track (100 $\mu$m).

Here, one shift pulse means to change once an excitation pattern formed by a 4-phase drive pulse comprising A phase, $\overline{A}$ phase, B phase, $\overline{B}$ phase. When the magnetic head 212 is shifted in a forward direction, for each shift pulse the excitation pattern is changed in the manner of 1001→1100→0110→0011, While when the magnetic head 212 is shifted in the opposite direction, the excitation pattern is varied in the opposite sequence. The 4-phase drive pulse can be used to generate the shift pulse as a clock pulse by means of hardware, while the shift pulse can also be generated by means of programs in the CPUs within the first control unit 240 and the second control unit, that is, the shift pulse may not exist actually. Here, for purposes of explanation, the concept of the shift pulse is used.

The magnetic head 212 reads the video signals recorded in the tracks on the magnetic disk 211 at a position where it is positioned. In this embodiment, since the magnetic disk 211 is constantly rotated at the speed of 3,600 r.p.m., for each rotation 1/60 sec., 1 track of video signals, that is, 1 field of FM (frequency modulation) video signals are reproduced from the magnetic head 212. Therefore, this system is compatible with the standard color television system such as NTSC system or the like by demodulating the reproduced FM video signals.

The reproduction outputs of the magnetic heads 212 are transmitted through a pre-amplifier 231 to a video signal process circuit 234 and an envelope detection circuit 232. The video signal process circuit 234 processes the video signals that are read out by the magnetic head 212 and outputs them as the composite color video signals for, for example, the NTSC format. The video signal process circuit 234 is also provided with a function to extract a vertical synchronizing signal VSYNC out of the demodulated NTSC format composite color video signal and to supply it to the control unit 240. The video signal process circuit 234 further processes a scan period of the video signal as a blank signal to thereby perform and muting operation, when it receives a signal MUTE from the control unit 240.

The color video signals output from the video signal process circuit 234 are visibly displayed via a video signal output terminal $V_3$ on the above-mentioned CRT 100 as the video signals recorded in the magnetic disk 211.

The envelope detection circuit 232 is a detection circuit which detects the envelope of the read signals of the magnetic head 212, that is, the frequency modulated video signals recorded in the tracks on the magnetic disk 211 and also outputs a voltage signal corresponding to the detected envelope. The voltage signal representing the envelope is transmitted to an analog/digital converter (A/D converter) 233, where it is converted into, for example, an 8-bit digital signal representing a quantization level of 256 and is then input to the control unit 240.

The envelope detection signal is used to search the tracks provided on the magnetic disk 211. If, with the magnetic head 212 being shifted in the radial direction of the magnetic disk 211, the envelope detection signal happens to show its peak at a certain position, then this position is the center of the track in which the video signals are recorded. In accordance with the input 8-bit digital signals, the control unit 240 controls the above-mentioned magnetic head shift/drive apparatus to thereby locate the magnetic head 212 onto the center of a given track. This is called a tracking control. The second control unit 250 is also composed of a CPU (preferably, a microprocessor), a memory for storing its programs and necessary data, and an interface providing the connection of the control unit with respect to its peripheral elements, circuits, devices and the like. The memory is provided with an area for storing the current position (track No.) of the magnetic head 212.

Also, the second control unit 250 is equipped with a stop signal input terminal $T_{14}$ for inputting a stop signal STOP that is output from the above-mentioned interface 255, a serial data input terminal $T_{15}$ for inputting command data ( serial data), a busy signal output terminal $T_{16}$ for outputting to the interface 255 a busy signal BUSY indicating that the video signal reproducing apparatus 210 is in operation, a synchronizing signal input terminal $T_{17}$ for inputting a synchronizing signal 263 which is output from the synchronization/isolation circuit 44 within the interface 255. Due to this structure, the second control unit 250 is capable of performing a synchronous operation in accordance with the synchronizing signal 263 input thereto via the interface 255 as well as an operation control to be explained later in accordance with various kinds of command data output from Computer 1 thereto through the interface 255.

Further, the second control unit 250, when the command data (stop) and the stop signal STOP are input thereto via the interface 255, is able to shift the magnetic head 212 onto a given track in which the video signals are not recorded and to stop the rotational operation of the magnetic disk 211.

In addition, the above-mentioned various switches are also connected to the second control unit 250 (the connections thereof are not shown), so that the second control unit 250 can also perform the key scan routine. And, according to the states of the switches read out by means of the key scan routine, the second control unit 250 controls the first control unit 240. That is, the second control unit 250 is placed above the first control unit 240.

In an initial tracking control as well as forward and backward feed processings to be described later, a drive pulse DP for driving the stepping motor 214 which is output from the first control unit 240 is be input to the second control unit 250, and, the second control unit 250, when it receives the drive pulse DP input, transmits it to the stepping motor 214 via the drive circuit 252.

Now, a ten-key pad 291 is adapted to specify the track No. (the target track No.) directly in place of Computer 1 and a signal representing the track No. is input to the second control unit 250. On receiving this signal, the second control unit 250 outputs a required number of pulses for driving the stepping motor 214 in a non-stop feed processing to be explained later. Also, when the non-stop feed processing is completed, then the second control unit 250 outputs a forward feed signal or a backward feed signal, which turns on a switching transistor 292 or 293. The switching transistor 292 is connected in parallel to a forward feed switch 415, while the transistor 293 is connected in parallel to a backward or reverse feed switch 416. Therefore, if the transistor 292 is turned on by the forward feed signal output from the second control unit 250, then the same effect as in the case of the forward feed switch 415 being pressed is given to the first control unit 240. On the other hand, if the backward or reverse feed signal is output, then the same effect as in the case of the reverse feed switch 416 being pressed is applied to the first control unit 240.

Also, the relationship between the track provided on the magnetic disk 211 and the home position HP (origin position or wait position) of the magnetic head 212 is similar to that in the above-mentioned first embodiment of the invention and thus the explanation thereof is omitted here.

Referring now to FIG. 18, there is illustrated the principle of high-speed random access to an arbitrary track.

Suppose that the magnetic head 212 is located at a position of the track No. TK and also that the track No. TK+N is given by Computer 1 as the target track to be accessed. At first, let us consider the case of $N \geq 2$.

To begin with, a forward non-stop feed is carried out over (N−1) track(s) up to the last track but the target track No. TK+N. As described before, since the magnetic head 212 can be shifted a distance corresponding to 1 track by giving 12 pulses to the stepping motor 214, in this case, 12×(N−1) pieces of pulses are given to the stepping motor 214. As a result of this, the magnetic head 212 is transferred at a stretch up to the track No. TK+N−1. This stretch feed is performed under control of the second control unit 250.

After then, a forward feed signal is applied from the second control unit 250 to the first control unit 240. As a result of this, the first control unit 240 carries out an ordinary forward feed tracking control, that is, moves the magnetic head 212 up to the forwardly adjacent track (track No. TK+N) and positions the magnetic head 212 at the center of the track. As discussed before, in this control operation, the drive pulses for the stepping motor 214 output from the first control unit 240 are supplied through the second control unit 250 to the stepping motor 214.

In the case of N≦−2, a reverse non-stop feed is performed by the second control unit 250. After then, a reverse feed signal is given to the first control unit 240 and a reverse feed tracking is carried out by the first control unit 240 via the second control unit 250.

When N=1 or −1, the non-stop feed by the second control unit 250 is not necessary, but only a forward feed or reverse feed tracking is carried out by the first control unit 240 under control of the second control unit 250.

In the case of N=0, the movement of the magnetic head 212 is not necessary and, therefore, no processings are to be performed.

Next, we will describe the forward and reverse feed and tracking control of the first control unit 240. This control includes the initial tracking processing as well as the forward and reverse feed control processings.

The initial tracking processing is carried out when a reset signal is given from the second control unit 250. The reset signal is applied to the first control unit 240 when the power supply is put into the unit, when the magnetic disk stored in the bucket is exchanged for a new one, or when the second control unit 250 decides it necessary to apply the reset signal. As discussed above, although the first control unit 240 carries out the key scanning at a given cycle, the necessary switches (such as a power supply switch, load switch, pack switch and the like) are, for example, grounded except when the second control unit 250 performs the key scanning, so that the changes of the states of these switches can not be detected by the key scanning by the first control unit 240.

In the initial tracking control, at first, the magnetic head 212 is returned to the home position HP, then the magnetic head 212 is moved in the forward direction from the home position HP, and, while searching mainly the track No. 1, the magnetic head 212 is positioned at the center of the track. This causes the track No. counter CN to provide a count value of 1, but, however, a forward feed signal is output from the second control unit 250 so that the value of the counter CN is advanced to a suitable value within a range of 2 to 49. As a result of this, the first control unit 240 starts a forward feed processing to described later and the drive pulses for the stepping motor 214 are output. However, the second control unit 250 neglects these drive pulses and does not apply them to the stepping motor 214. Therefore, the magnetic head 212 is not moved actually but only the counter CN is advanced step by step. What this means technically will be explained later.

Next, a general idea of the forward and backward feed processings as well as the tracking processing in connection with FIG. 5 which has already been discussed.

The first control unit 240 is detecting the states of the forward feed signals, reverse feed signals and the like at a given cycle.

Consequently, when the forward feed signal is detected (that is, YES in Step 121), the first control unit 240 performs the following forward feed and tracking processings.

If the value of the track No. counter CN is not 50 (that is, NO in Step 131), then, in order to move the magnetic head 212 to a position adjacent to the center of a forwardly adjacent track, the variations of the drive pulses corresponding to 11 pieces of forward shift pulses are given through the second control unit 250 to the stepping motor 214 (Step 133). And, the first control unit 240 reads the then output of the envelope detection circuit 232. In succession, the first control unit 240 outputs one forward shift pulse and, similarly, reads or detects the envelope level of the envelope detection circuit 232. If there is no significant difference between the former and latter envelope levels, then while changing the shift direction of the magnetic head 212 in the forward and reverse directions, envelope levels nearby are searched a number of times. After it confirms that there is no significant difference between the respective envelope levels, the first control unit 240 decides the position as the center of the track and thus positions the magnetic head 212 at the position. If there is found any significant difference between the former and latter envelope levels, then the magnetic head 212 is moved further 1 shift pulse in the direction of the larger envelope level and a similar processing is repeated. This is the tracking control processing in Step 134.

When the envelope level does not exceed a given threshold level, then it is decided that no video signal is recorded in the track.

Finally, the value of the track No. counter CN is decremented by 1 (Step 136).

If the value of the track No. counter CN reaches 50, then the forward feed is impossible and thus an alarm processing by means of the lighting of the alarm display lamp, the alarming buzzing of the buzzer and the like is to be performed (Step 135).

If the reverse or backward feed signal is detected (YES in Step 122), then a processing similar to the above-mentioned processing is performed in the reverse feed direction (Steps 143, 144). The counter CN is decremented only 1 (Step 146). Also, in the case of CN=1, an alarm processing is performed (Steps 141, 147).

Next, the processings of the second control unit 250 will be described. The processings of the second control unit 250 include a reset processing and a random access processing.

The reset processing is a processing to return the current position memory area of the memory within the second control unit 250 to the initial state, that is, a state in which the track No. 1 is stored as a current position. This processing, as described before, is initiated when the magnetic disk 211 is replaced, when the power supply is put into operation, or in other cases. Then, the second control unit 250 transmits a reset signal to the first control unit 240. In response to this reset signal, the above-mentioned initial tracking processing is carried out in the first control unit 240 and thus the magnetic head 212 is positioned at the position of the track of track No. 1. Also, in the second control unit 250, track No. 1 is set up in the current position memory area of the memory thereof. After then, by repeating the transmission of the above-mentioned forward feed signals, the value of the track No. counter CN in the first control unit 240 is set to a suitable value within a range of 2 to 49.

In FIG. 19, there is illustrated an outline of the random access processing to be executed by the second control unit 250. It is assumed that K is stored as the track No. in the current postion memory area.

If a value (K+N) is indicated by Computer 1 as the target track No. to be accessed, then this value is read into (Step 331), and whether the value (K+N) exists within a range of 1~50 is first checked (Step 332). If it is present within this range, then the track No. in the current position memory area is subtracted from the track No. indicated by Computer 1, that is, an operation, (K+N)−K, is performed, and, as a result of this, whether N is 0 or not is checked (Steps 333, 334).

If the track No. indicated by Computer 1 does not exist within the range of 1~50, or, if, as a result of the operation, N is found 0, then no processing is to be performed.

After then, whether N=1, N=−1, or N is other than 1 or −1 is checked (Step 335). If N≦2 or N≧−2, then whether N>0 or N<0 is further checked (Step 336). If N>0, then the processing is turned over to a forward random access processing, while if N<0, then it is turned over to a reverse random access processing.

In the forward random access processing, in order to move the magnetic head 212 by (N−1) track(s) in the forward direction, the drive pulses corresponding to 12 (N−1) pieces of shift pulses are output from the second control unit 250 and are then applied through the drive circuit 252 to the stepping motor 214 (Step 341).

After then, the forward feed signal is given from the second control unit 250 to the first control unit 240 (Step 342).

In accordance with the forward feed signal, the first control unit 250 starts the forward tracking processings (Step 121, 131~136) shown in FIG. 5 and outputs a series of drive pulses. On receiving these drive pulses, the second control unit 250 outputs them intact to the stepping motor 214. This processing is carried out in the following manner.

At first, whether the excitation pattern of the drive pulse input from the first control unit 240 to the second control unit 250 is "0000" is checked (Step 343). Here, the excitation pattern is used to express the state of the 4 phases A, $\overline{A}$, B, $\overline{B}$ in terms of "1001", "1100" and the like. The fact that the excitation pattern is "0000" means that a drive pulse has not been output from the first control unit 240. Therefore, the processing to be performed in Step 343 is to wait for the arrival of the drive pulse from the first control unit 240 after the transsmission of the forward feed signal.

Then, when the drive pulse for a forward feed processing is output from the first control unit 240 (NO in Step 343), then the second control unit 250 reads the excitation pattern of the drive pulse (Step 344) and outputs a drive pulse of the same excitation pattern with the read drive pulse to the drive circuit 252 of the stepping motor 214 (Step 346). This is equivalent to the fact that the drive pulse output from the first control unit 240 is passed intact through the second control unit 250.

By repeating this processing, the forward feed tracking is carried out on, and, when the magnetic head 212 is positioned on the center of the target track, then the drive pulse ceases to be output from the first control unit 240. For this reason, the excitation pattern that is read by the second control unit 250 becomes "0000" (YES in Step 345).

After then, the reverse feed signal is supplied to the first control unit 240 (Step 347), and the target track No. (K+N) indicated by Computer 1 is stored into the memory (i.e., the current position memory area of the memory) of the second control unit 250 as the current position of the magnetic head 212 (Step 348). In response to the reverse feed signal supplied in Step 347, the first control unit 240 executes the reverse feed tracking processing shown in FIG. 5 (Steps 122, 141~146). Although the drive pulse is input from the first control unit 240 to the second control unit 250, the second control unit 250 ignores the input of this drive pulse and does not output a drive pulse to the stepping motor 214. Therefore, the magnetic head 212 is not actually shifted. In other words, since, in the tracking control in Step 144 shown in FIG. 6, it is decided that there is no significant difference between the former and latter envelope levels, on the side of the first control unit 240, the reverse feed tracking processing ends normally.

The reverse-direction random access in Steps 351~357, 348 is performed in a manner similar to the above-mentioned forward-direction random access. However, the reverse-direction random access is different from the forward-direction random access in that in Step 351 a drive pulse corresponding to 12×(N−1) pieces of reverse-direction shift pulses is transmitted, that in Step 352 the reverse feed signal is transmitted, and that in Step 357 the forward-direction signal is transmitted.

In the case of N=1, since the non-stop feed by the second control unit 250 is not necessary, Step 341 is skipped over to Step 342 and thus the forward feed by the first control unit 240 is performed. In the case of N=−1, Step 351 is skipped over to Step 352.

Referring to the flowchart shown in FIG. 19, in the case of the forward-direction random access, a forward-direction signal is given to the first control unit 240 to carry out a forward-direction tracking (Step 342) and further a reverse-direction signal is given to thereby perform a pseudo-reverse-direction tracking (Step 347). The reverse-direction random access is also executed in a manner similar to the above. (See Steps 352, 357). This is performed for purposes of fixing the value of the track No. counter CN of the first control unit 240.

As mentioned above, when the forward feed processing is executed in the first control unit 240, then the value of the track No. counter CN is incremented by 1, while, when the reverse feed processing is performed, then it is decremented by 1 (Steps 136, 146 in FIG. 6). Therefore, if there are not provided the processings in Steps 347, 357 in FIG. 19, the following problems will be produced.

Here, in connection with FIG. 20, it is assumed that the current position of the magnetic head 212 is the track No. n and also that the value of the track No. counter CN is m. When (n+2) is indicated by Computer 1 and the forward-direction random access is executed, then the current position becomes (n+2) and the value of the counter CN becomes (m+1). Next, if a random access to the track No. (n+4) is executed, then the current position becomes (n+4) and the value of the counter CN becomes (m+2). When such small forward-direction random accesses are repeated four times, then the current position becomes (n+11) and the value of the counter CN becomes (m+4). After then, if n is indicated by Computer 1 and thus a reverse-direction random access is executed, then the current position is returned to n but the value of the counter CN is returned only to (m+3).

If the above-mentioned operations are repeated a number of times, then the value of the counter CN is gradually increased to reach 50 in the long run. When the value of the counter CN reaches 50, then the forward feed processing is no longer performed (Steps 131, 137 in FIG. 5).

On the other hand, in case the value of the counter CN is gradually decreased, similar problems arise, that is, if the value of the counter CN reaches 1, then the reverse feed processing is no longer performed.

In order to eliminate the production of the above-mentioned problems, in the processings in FIG. 19 for the forward-direction random access, after the forward-direction signal is applied to the first control unit 240 and thereby the forward feed is executed (Step 342, CN is incremented by 1), the reverse-direction signal is given to thereby perform a reverse-direction do-nothing feed that is, an operation to count up or down without shifting the magnetic head (Step 347, CN is decremented by 1) and thus the value of the counter CN is fixed. In the case of the reverse-direction random access, this principle applies similarly.

It is necessary that the value of the track No. counter CN within the first control unit 240 has been set to a proper value existing within a range of 2 to 49. To this end, in the reset processing (initial tracking process), by performing a forward-direction do-nothing feed once or 48 times, the value of the counter CN is set to a proper value within a range of 2 to 49.

As shown in FIG. 17, the excitation pattern of the drive pulse given to the stepping motor 214 varies always in a predetermined sequence, so that the stepping motor 214 can be rotated smoothly.

However, in the above-mentioned embodiment, the drive pulse for the non-stop feed is generated by the second control unit 250, while the drive pulse for the forward feed or reverse feed to be performed after the non-stop feed is generated by the first control unit 240 and is given intact through the second control unit 250 to the stepping motor 214. For this reason, there can not always be obtained the above-mentioned predetermined sequence relation between the last excitation pattern in the non-stop feed processing and the first excitation pattern in the forward feed or reverse feed, but, in many cases, the excitation pattern is varied in a discontinuous manner at the time when these two processings are exchanged. In case of such discontinuous variations, there is a possibility that the stepping motor 214 may rotate suddenly by a certain angle in excess, or may turn in the reverse direction by a certain angle when the forward feed must be executed. For example, if the motor turns in the reverse direction, even after the first 11 pieces of shift pulses are applied in the forward feed or reverse feed processing, the magnetic head 212 is not able to reach around the peak of the envelope level in the target track and thus the envelope level read at that time may be lower than a given threshold level. If so, the first control unit 240 can do nothing but to decide that video signals have not yet been recorded in the target track.

In order to eliminate the possibility of such conditions being produced, in an embodiment to be described below, the output drive pulse of the second control unit 250 and the output drive pulse of the first control unit 240 are matched together in phase.

The phase match processings are shown in FIG. 21 in the case of the forward-direction random access. In this figure, the same processings as shown in FIG. 19 are given the same designations thereof.

In the memory of the second control unit 250, there is provided an area Po for storing the output excitation pattern. In this area Po, there is stored the excitation pattern that was output finally from the second control unit 250 in the preceding processing (Step 367).

Now, if the forward-direction random access is detected (FIG. 19, YES in Step 336), then the processing is turned over to a processing shown in FIG. 21. That is, the second control unit 250 outputs drive pulses corresponding to $12 \times (N-1)$ pieces of shift pulses in the forward direction, the drive pulses including as the first excitation pattern thereof the next excitation pattern (an excitation pattern advancing by 1 step in the forward direction) of the excitation pattern stored in the memory area Po (Step 141A). For example, in connection with FIG. 17, if the excitation pattern stored in the area Po is "1001", then the excitation pattern to be output first in Step 341A is "1100", and, after this, the drive pulses are output in the sequence of "0110", "0011" and the like. By means of this processing, the stepping motor 214 is able to rotate smoothly in the forward direction from an angle position where it stopped at the end of the preceding processing.

When the shift of the magnetic head 212 in the forward direction by $(N-1)$ track(s) is completed, then the excitation pattern of the drive pulse output finally in this shift processing is stored in the area Po (Step 361).

And, a forward feed signal is transmitted from the second control unit 250 to the first control unit 240 (Step 342), and the second control unit 250 waits for the start of a forward processing by the first control unit 240 (Step 343).

When the first control unit 240 starts the forward feed processing, then a drive pulse of one of the excitation patterns other than the pattern "0000" is sent from the first control unit 240 to the second control unit 250 to thereby provide NO in Step 343. The second control unit 250 outputs to the stepping motor 214 a drive pulse of the next excitation pattern of the excitation pattern stored in the area Po, regardless of the excitation pattern of the drive pulse input thereto from the first control unit 240 (Step 362). And, whether the excitation pattern of the drive pulse input to the second control unit 250 from the first control unit 240 is varied is monitored (Step 363).

As described above, in the forward feed processing, after transmission of the drive pulses corresponding to 11 pieces of shift pulses in the forward direction, the first control unit 240 turns over to the tracking control in which, in accordance with the outputs of the envelope detection circuit 232, it rotates the stepping motor 214 in the positive or reverse direction to thereby search the peak of the envelope. For this reason, at least the first 11 pieces of the excitation patterns of the drive pulses output from the first control unit 240 vary in the forward direction, but, the subsequent patterns may vary in either of the forward or reverse direction.

In either case, the second control unit 250 monitors the variations of the excitation patterns input thereto from the first control unit 240 and, if any variations are detected then the second control unit 250 checks whether the respective excitation patterns are changed in the forward direction or in the reverse direction, or whether they become "0000" (Step 364).

Since the excitation patterns for the first 11 shift pulses are varied in the forward direction, the processing advances to Step 365, in which the next excitation pattern of the excitation pattern of the drive pulse output in the preceding processing from the second control unit 250, that is, the excitation pattern advanced 1 step in the forward direction from the preceding pattern is output to the stepping motor 214. When the first control unit 240 enters into a tracking routine, then the input excitation patterns vary in either of the forward or reverse direction. When the excitation patterns vary in the forward direction, as mentioned above, the excitation pattern advanced 1 step in the forward direction from when the last output excitation pattern is output (Step 365). Also, when the excitation patterns vary in the reverse direction, the excitation pattern returned 1 step in the reverse direction from when the last output excitation pattern is output (Step 366).

The drive pulses input to the second control unit 250 from the first control unit 240 are never applied direct to the stepping motor 214. The excitation patterns of the drive pulses input from the first control unit 240 are used only to detect whether the excitation patterns themselves are varied or not, and, if any, whether they are varied in the forward direction or in the reverse direction. The drive pulses to be supplied to the stepping motor 214 are formed in the second control unit 250 such that they can be matched with those output in the preceding time, that is, they can succeed the excitation pattern output in the preceding time. In this manner, the stepping motor 214 is able to rotate always smoothly.

When the excitation pattern input from the first control unit 240 becomes "0000", which means that the forward feed processing in the first control unit 240 is completed, then the last excitation pattern output from the second control unit 250 is stored into the above-mentioned memory area Po (Step 367), and the reverse feed siganl transmission as well as the magnetic head current position storage processing are executed (Steps 347, 348).

In case of the reverse direction random access as well, of course, the phase matching of the drive pulses is performed substantially in the same manner as mentioned above. Specifically, Step 341A is to be modified to a process in which $12 \times (N-1)$ pieces of pulses are output in the reverse direction, the pulses including as the first excitation pattern the excitation pattern returned 1 step in the reverse direction from the excitation pattern that is stored in the memory area Po; Step 342 to a processing of "REV Signal Transmission"; Step 362 to a processing in which the excitation pattern returned 1 step in the reverse direction of the excitation pattern of the memory area Po is output; and, Step 347 to a processing of "RWD Signal Transmission".

Also, if a stop command is output from Computer 1 to the apparatus 210 while the track access is being executed by the above-mentioned control unit 250, then the second control unit 250, at first, in accordance with the command data (stop) input via the serial data input terminal $T_{10}$, outputs to the stepping motor 214 a given drive pulse to shift the magnetic head 212 from the track being currently accessed to another track in which video outputs are not recorded. After the magnetic head is shifted to the latter track by the stepping motor 214, the second control unit 250, in accordance with the stop signal STOP input via the stop signal input terminal $T_{14}$, outputs to the servo control circuit 223 a control output 294 for stopping the rotational operation of the magnetic sheet 211 that is being rotationally operated. On receiving the control signal 294, the servo control circuit 223 stops the rotational operation of the magnetic sheet 211 that is being rotationally operated.

Also, the video signal reproducing apparatus employed in the above-mentioned second embodiment of the invention is constructed such that, when the power supply of the apparatus is turned off to stop the operation of the apparatus, in accordance with a given command data output from Computer 1, the shift of the magnetic head 212 as well as the rotational operation of the disk motor 221 can be stopped.

What is claimed is:

1. An image display system comprising:
    a plurality of display devices arranged in a matrix manner so as to form a complete screen;
    a plurality of video signal reproducing apparatus respectively provided correspondingly to said plurality of display devices for outputting a video signal to said plurality of display devices, each of said video signal reproducing apparatus including a magnetic recording medium for storing video signals, rotation drive means for driving said magnetic recording medium to rotate constantly at a predetermined speed, drive means for moving a magnetic head in the radial direction of said magnetic recording medium, and control means for outputting control data for controlling said drive means in accordance with said control data for specifying the feed of said magnetic head so that said video signals stored in an arbitrary track can be output;
    a computer for outputting to a bus line specification data for specifying one or more of said video signal reproducing apparatus and said control data to be given to said video signal reproducing apparatus to be specified by said specification data, so that said video signals can be output from each of said video signal reproducing apparatus; and
    a plurality of interfaces provided correspondingly to said plurality of video signal reproducing apparatus for connecting said computer with said plurality of video signal reproducing apparatus, each of said interfaces including setting means for outputting data representing the video signal reproducing apparatus connected therewith, comparison means for comparing said specification data input therein through said bus line from said computer with said data of said setting means and for outputting a signal indicating whether both of said compared data are identical with each other, and control signal generation means for outputting to each of said video signal reproducing apparatus said control data input together with said specification data when a signal indicating that both of said data are identical with each other is output from said comparison means or when said specification data input from said computer specifies all of said video signal reproducing apparatus.

2. An image display system as defined in claim 1, wherein said plurality of display devices are provided in each of steps necessary in manufacturing and production lines to serve as information transmission means to said steps.

3. An image display system as defined in claim 1, wherein said plurality of display devices are arranged in a matrix manner, whereby each of said display devices displays an allotted part of a complete image on the screen thereof and said plurality of display devices, as a whole, are able to provide said complete image.

4. An image display system as defined in claim 1, wherein said specification data and control data output from said computer are output allotted to a specification bit and a control bit which are respectively given bits among a plurality of bits in a bus line for connecting said computer with said interfaces.

5. An image display system as defined in claim 1, wherein said specification data and control data output from said computer are output allotted in a time series manner to said bus line for connecting said computer with said interfaces.

* * * * *